United States Patent [19]
Matsuura et al.

[11] Patent Number: 6,011,589
[45] Date of Patent: Jan. 4, 2000

[54] PICTURE CODING DEVICE WHERE THE QUANTIZATION STEP IS ADJUSTED IN RESPONSE TO A MOTION VECTOR

[75] Inventors: Yoshinori Matsuura; Hiroshi Segawa; Shinichi Masuda, all of Tokyo, Japan

[73] Assignees: Mitsubishi Denki Kabushiki Kaisha; Mitsubishi Electric Engineering Co., Ltd., both of Tokyo, Japan

[21] Appl. No.: 08/805,326

[22] Filed: Feb. 24, 1997

[30] Foreign Application Priority Data

Sep. 3, 1996 [JP] Japan ................................ 8-233365

[51] Int. Cl.$^7$ ...................................... H04N 7/18
[52] U.S. Cl. .......................... 348/413; 348/405; 348/404; 348/415; 348/416; 348/412; 348/699
[58] Field of Search ..................... 348/384, 390, 348/404, 405, 406, 407, 411, 412, 413, 416, 419, 420, 699

[56] References Cited

U.S. PATENT DOCUMENTS

| | | | |
|---|---|---|---|
| 5,089,888 | 2/1992 | Zdepski et al. ............. | 348/405 |
| 5,333,012 | 7/1994 | Singhal et al. ............. | 348/405 |
| 5,475,433 | 12/1995 | Jeong ........................ | 348/419 |
| 5,731,835 | 3/1998 | Kuchibholta ............... | 348/405 |
| 5,745,169 | 4/1998 | Murphy et al. ............. | 348/192 |
| 5,751,359 | 5/1998 | Suzuki et al. .............. | 348/405 |

FOREIGN PATENT DOCUMENTS

3-256484 11/1991 Japan .
4-176290 6/1992 Japan .

OTHER PUBLICATIONS

ISO–IEC/JTC1/SC29/WG11 MPEG93/225B Test Model 4 "10 Rate Control and Quantization Control", Feb. 5, 1993, pp. 70–73.

*Primary Examiner*—Anand S. Rao
*Attorney, Agent, or Firm*—Burns, Doane, Swecker & Mathis, LLP

[57] ABSTRACT

An object of the present invention is to improve visual picture quality. A picture signal is divided into a plurality of macro blocks and coding is conducted in macro block units. The coding is conducted including quantization process by a quantization portion. A motion compensation portion outputs the quantity of motion, L, in macro block units. An average quantity of motion, $L_{ave}$, of a reference picture stored in a frame memory is outputted from a division portion. A control portion compares the quantity of motion L with two reference values relative to the average quantity of motion $L_{ave}$ and makes a correction to lower the quantization step in the quantization portion for macro blocks whose quantity of motion L is between the reference values. Accordingly, picture quality is improved in part of picture where motion is small and deterioration of visual picture quality is noticeable. At the same time, since the correction is not applied to picture with such slow motion that deterioration of picture quality is small, redundancy of coded signal does not unnecessarily increase.

18 Claims, 28 Drawing Sheets

PICTURE CODING DEVICE WHERE THE QUANTIZATION STEP IS ADJUSTED IN RESPONSE TO A MOTION VECTOR

BACKGROUND OF THE INVENTION

1. Field of the Invention

The present invention relates to picture coding devices, and particularly to improvement for enhancing visual picture quality.

2. Description of the Background Art

FIG. 46 is a block diagram showing the structure of a conventionally known picture coding device as a background of the invention. This device 151 realizes the conventionally known picture coding system shown in "ISO-IEC/JTC1/SC29/WG11 MPEG93/225B Test Model4."

As shown in FIG. 46, a digitized picture (image) signal (input picture) PS is inputted to an activity calculating portion 11. The activity calculating portion 11 calculates the degree of variation of pixel values in the input picture signal PS and transmits the result to a control portion 91 as an activity signal 31. The picture signal PS passing through the activity calculating portion 11 is inputted to a switching portion 12.

The switching portion 12 includes a differential circuit for calculating a difference of pixel values between the picture signal PS transmitted from the activity calculating portion 11 and a predictive picture 30 from a motion compensation portion 18. The switching portion 12 further includes a switch portion for selecting and outputting one of the differential picture signal from the differential circuit and the picture signal PS from the activity calculating portion 11. The switch portion operates in response to a selection signal 32 from the control portion 91.

The signal outputted from the switch portion is inputted to a discrete cosine transform portion (DCT) 13. The DCT 13 performs the so-called discrete cosine transform. In the discrete cosine transform, the picture signal PS is transformed for each block composed of 8×8 pixels, for example, into a set of space frequency components (DCT coefficients) as many as the pixels forming the block (e.g., 8×8=64). The DCT coefficients obtained by the transform are inputted to a quantization portion 14.

The quantization portion 14 refers to a set of coefficient values defined in a quantization table included therein and a quantization step direction signal 33 sent from the control portion 91 to conduct quantization for each DCT coefficient. That is to say, the DCT coefficients are transformed into quantization coefficients. The quantization step direction signal 33 uniformly provides a common multiplier factor to the set of coefficient values defined in the quantization table to correct the width of quantization based on the quantization table, that is, the quantization steps, with the common multiplier factor to all DCT coefficients. As the quantization step becomes smaller, deterioration of picture quality is suppressed, but the amount of signal increases.

The quantization coefficient obtained in the quantization portion 14 is inputted to a variable-length coding portion (VLC) 19 and also inputted to an inverse quantization portion 15. The inverse quantization portion 15 performs inverse operation to that in the quantization portion 14. Accordingly, a signal in the same form as the DCT coefficient before quantized is obtained.

Since the processing in the quantization portion 14 is generally non-reversible i.e. lossy, however, the DCT coefficient reconfigured in the inverse quantization portion 15 is generally not the same as the DCT coefficient outputted from the DCT 13. That is to say, the output from the inverse quantization portion 15 generally includes a quantization error caused by the processing in the quantization portion 14. Needless to say, the quantization error becomes smaller as the quantization step becomes smaller.

The DCT coefficient obtained in the inverse quantization portion 15 is inputted to an inverse discrete cosine transform portion (inverse DCT) 16. The inverse DCT 16 performs inverse operation to that in the DCT 13. As a result, a signal in the same form as the picture signal PS before subjected to DCT transform in the DCT 13 is obtained. Needless to say, this picture signal is generally not the same as the picture signal PS but it includes a quantization error.

The reconfigured picture signal is stored in frame (picture; a piece of picture) units into a frame memory 17 as a signal for a reference picture. The reference picture signal stored in the frame memory 17 is inputted to the motion compensation portion 18.

The picture signal PS inputted to the activity calculating portion 11 is inputted to the motion compensation portion 18 too. Then the motion compensation portion 18 searches for part of the reference picture which is the closest to the picture signal PS in macro block units and sends it to the differential circuit in the switching portion 12 as a predictive picture 30. It also sends vector representing displacement from the predictive picture to the corresponding macro block on the picture signal PS to the VLC 19 as motion vector V.

The macro block is a unit of picture defining the motion vector V, which is formed of 16×16 pixels for luminance signal and 8×8 pixels for color-difference signal, for example. When the macro block is defined with 16×16 pixels for the luminance signal, the DCT transform process in the DCT 13 and the quantization process in the quantization portion 14 are applied to the luminance signal in each of blocks of 8×8 pixels, a quarter of one macro block.

The switching portion 12 sends the picture signal PS (non-differential picture 35) and the differential picture 36 to the control portion 91. The control portion 91 compares the non-differential picture 35 and the differential picture 36 in macro block units and sends the selection signal 32 so that the switch portion selects one having a smaller pixel value, in other words, one having a smaller amount of signal.

In the VLC 19, variable-length coding such as the Huffman coding is applied to the inputted quantization coefficient to provide a coded signal CS. At this time, the motion vector V sent from the motion compensation portion 18 is added as part of the coded signal CS. This enables a decoding device which reconfigures the picture signal PC from the coded signal CS to decode taking the motion vector V into account.

The coded signal CS is once accumulated in an output buffer 20 and then outputted to the outside at proper time. The output buffer 20 sends out a status signal 34 indicative of its status, i.e., whether the buffer is overflowing or vacant, to the control portion 91.

The control portion 91 outputs the selection signal 32 and the quantization step direction signal 33 on the basis of the activity signal 31, the status signal 34, the non-differential picture 35 and the differential picture 36.

FIG. 47 is a block diagram showing the internal structure of the control portion 91. As shown in FIG. 47, the control portion 91 includes a quantization step control portion 51 and an inter/intra direction portion 42. The quantization step control portion 51 sends the quantization step direction signal 33 for controlling the quantization portion 14 on the basis of the activity signal 31 and the status signal 34. The inter/intra direction portion 42 sends the selection signal 32 for controlling the switch portion of the switching portion 12 on the basis of the non-differential picture 35 and the differential picture 36.

The quantization step control portion 51 includes a target bit allocate portion 43, a rate control portion 44 and an adaptive quantization portion 45. The control portion 91 including these components operates according to the flow chart of FIG. 48. That is to say, when processing is started, first, in Step S1, the target bit allocate process is performed.

This process is for evaluating the number of bits of signal required to code the picture signal PS prior to the coding, which is performed by the target bit allocate portion 43. The processings in individual steps in FIG. 48, including the Step S1, are performed in macro block units.

Next, in Step S2, the rate control processing is executed. This process is for setting the quantization step as a reference value for each macro block, which is conducted in the rate control portion 44. As has been stated above, the quantization portion 14 is provided with a quantization table including coefficient values individually defining quantization steps for each DCT coefficient in a macro block. Each component of the quantization table is uniformly multiplied by a correction coefficient to secondarily set the quantization step. The processing in Step S2 just corresponds to the process of preparatorily setting the correction coefficient in macro block units.

Next, in Step S3, the adaptive quantization processing is conducted. In this processing, the preparatorily set correction coefficient is modified on the basis of the activity signal 31 and the status signal 34 to finally determine the quantization step. Then the quantization step direction signal 33 corresponding to the determined quantization step is transferred to the quantization portion 14. This processing is accomplished in the adaptive quantization portion 45.

Next, in Step S4, the processing for directing inter/intra is conducted. This processing is carried out in the inter/intra direction portion 42. As has been stated above, in this processing, the pixel values are compared in macro block units between the non-differential picture 35 and the differential picture 36 and the selection signal 32 is outputted to the switching portion 12 so that one having a smaller pixel value, i.e., one having a smaller amount of signal is selected. As a result, the DCT 13 is fed with a picture signal of the smaller quantity.

Next, the process moves to Step S6 to determine whether the process is to be terminated or not. If it is determined that the process should be terminated, it is terminated. On the other hand, if it is determined that the process should not to be terminated because there remain macro blocks to be processed, for example, the process returns to Step S1 and the processings in and after Step S1 are applied to the next macro block. This way, processings are applied to all macro blocks one after another.

As stated above, the conventional device 151 is constructed so that the inter-picture coding (inter coding) using motion compensative prediction, one of high-efficiency coding systems, and the intra-picture coding (intra coding) of coding inside a piece of picture (frame; picture) can be selectively executed in macro block units, when coding the picture signal PS.

The conventional device 151 constructed and operating as explained above have the following problems.

Visually recognized picture quality, i.e., visual picture quality generally varies depending on motion of picture.

That is to say, it is known that deterioration of picture quality due to coding is visually more noticeable in a picture with slow motion than in a picture with fast motion. This is due to the fact that the eyes have difficulty in following a picture with rapid motion and that the visual resolution is held high for a slow-motion picture or a still picture having a less amount of time differential information. Thus the visual picture quality generally depends on magnitude of the motion vector V.

However, the conventional device 151 does not consider the relation between the motion vector V and the subjective picture quality in coding, resulting in the problem that the coded signal CS becomes redundant for macro blocks with large motion vector V, and on the other hand, deterioration of picture quality is noticeable for macro blocks with small motion vector V.

Furthermore, in the conventional device 151, magnitude of the quantization step of the predictive picture is not considered in coding, which results in the problem that when the quantization step of the predictive picture is large and the quantization error is large, the large quantization error is transmitted to the coded signal CS obtained by inter-picture coding using the predictive picture. That is to say, deterioration of picture quality caused by coding is unnecessarily transmitted to the following pictures.

SUMMARY OF THE INVENTION

The present invention is directed to a picture coding device wherein an input picture is divided into a plurality of blocks, and one of inter-picture coding using a predictive picture and motion vector and intra-picture coding can be selectively performed for each of the plurality of blocks, each coding including quantization processing.

According to a first aspect of the present invention, the picture coding device comprises motion compensation means for comparing a reference picture obtained by decoding a coded picture and the input picture to determine the predictive picture in the reference picture for each of the plurality of blocks, determining the motion vector as motion relative to the predictive picture for each of the plurality of blocks, and calculating its magnitude, or the quantity of motion.

The device of the first aspect further comprises average value calculating means for calculating an average value of the quantity of motion over a certain range of the plurality of blocks and quantization step correcting means for comparing the quantity of motion with a reference value group including at least one reference value and correcting quantization step in the quantization processing according to a result of the comparison for each of the plurality of blocks, wherein each of the at least one reference value is provided as a value relative to the average value.

Preferably, according to a second aspect of the present invention, in the picture coding device, the value relative to the average value is provided as a sum or a product of the average value and a constant.

Preferably, according to a third aspect of the present invention, in the picture coding device, the average value calculating means uses the entirety of the reference picture as the certain range.

Preferably, according to a fourth aspect of the present invention, in the picture coding device, the average value calculating means uses already-coded part in the input picture as the certain range.

Preferably, according to a fifth aspect of the present invention, in the picture coding device, the average value calculating means uses the reference picture plus already-coded part in the input picture as the certain range.

Preferably, according to a sixth aspect of the present invention, in the picture coding device, the average value calculating means comprises: a selecting means for selecting the reference picture as the certain range if an area of already-coded part in the input picture is equal to or smaller than a predetermined range and selects the already-coded part in the input picture if it exceeds the predetermined range.

Preferably, according to a seventh aspect of the present invention, in the picture coding device, each of the input picture is inputted twice and the average value calculating means calculates the average value using the entirety of the input picture as the certain range on the basis of the input picture inputted at the first time.

Preferably, according to an eighth aspect of the present invention, in the picture coding device, the at least one reference value which belongs to the reference value group which the quantization step correcting means refers to includes two reference values and the quantization step correcting means makes a correction to lower the quantization step when the quantity of motion is between the two reference values.

According to a ninth aspect of the present invention, the picture coding device comprises motion compensation means for comparing a reference picture obtained by decoding a coded picture and the input picture to determine the predictive picture in the reference picture for each of the plurality of blocks, determining the motion vector as motion relative to the predictive picture for each of the plurality of blocks, and calculating its magnitude, or the quantity of motion.

The device of the ninth aspect further comprises inter/intra directing means for comparing the quantity of motion with a reference value group including at least one reference value and directing whether to conduct the inter-picture coding or the intra-picture coding according to a result of the comparison for each of the plurality of blocks.

Preferably, according to a tenth aspect of the present invention, the picture coding device further comprises quantization step correcting means for comparing the quantity of motion with another reference value group including at least one reference value and correcting quantization step in the quantization processing according to the result for each of the plurality of blocks.

Preferably, according to an eleventh aspect of the present invention, the picture coding device further comprises average value calculating means for calculating an average value of the quantity of motion over a certain range of the plurality of blocks and the quantization step correcting means uses a value relative to the average value as each of the at least one reference value belonging to the reference value group to which the quantization step correcting means refers.

Preferably, according to a twelfth aspect of the present invention, the picture coding device further comprises average value calculating means for calculating an average value of the quantity of motion over a certain range of the plurality of blocks and the inter/intra directing means uses a value relative to the average value as each of the at least one reference value which belongs to the reference value group.

Preferably, according to a thirteenth aspect of the present invention, in the picture coding device, the at least one reference value which belongs to the reference value group which the inter/intra indicating means refers to includes two reference values and the inter/intra directing means provides a direction so that the inter-picture coding is conducted when the quantity of motion takes a value between the two reference values and provides a direction so that the intra-picture coding is conducted when the quantity of motion takes other values.

According to a fourteenth aspect of the present invention, the picture coding device comprises motion compensation means for comparing a reference picture obtained by decoding a coded picture and the input picture to determine the predictive picture in the reference picture for each of the plurality of blocks and determining the motion vector as motion relative to the predictive picture.

The device of the fourteenth aspect further comprises quantization step calculating means for calculating quantization step for the predictive picture, comparing means for comparing the quantization step with a reference value, and operation means for making a correction to lower a quantization step of a macro block in the input picture corresponding to the predictive picture when the quantization step is larger than the reference value.

Preferably, according to a fifteenth aspect of the present invention, in the picture coding device, the quantization step calculating means obtains a weighted average of values of quantization steps of macro blocks which overlap with the picture region for which the quantization step is calculated, by weighting with areas of the overlapping parts thereby to calculate the quantization step of the picture region.

Preferably, according to a sixteenth aspect of the present invention, the picture coding device further comprises reference value calculating means for calculating the reference value and the reference value calculating means calculates a value relative to an average value of quantization step over a certain range of the reference picture and provides the value to the reference value.

According to a seventeenth aspect of the present invention, the picture coding device comprises motion compensation means for comparing a reference picture obtained by decoding a coded picture and the input picture to determine the predictive picture in the reference picture for each of the plurality of blocks and determining the motion vector as motion relative to the predictive picture for each of the plurality of blocks.

The device of the seventeenth aspect further comprises quantization step calculating means for calculating quantization step for the predictive picture, comparing means for comparing the quantization step with a reference value, and means for providing a direction so that the intra-picture coding is applied to a macro block in the input picture corresponding to the predictive picture when the quantization step is larger than the reference value and the inter-picture coding is applied when it is not so.

According to an eighteenth aspect of the present invention, the picture coding device comprises motion compensation means for, on the basis of a reference picture obtained by decoding a coded picture and the input picture, determining the predictive picture in the reference picture for each of the plurality of blocks and determining the motion vector as motion relative to the predictive picture for each of the plurality of blocks.

This motion compensation means includes quantity-of-distortion calculating means for calculating a quantity of distortion for each of the plurality of blocks, the quantity of distortion corresponding to magnitude of a gap of pixel values between each of a group of picture parts in the reference picture obtained by shifting each of the plurality of blocks in pixel units in a predetermined range and each block, quantization step calculating means for calculating quantization step of each of the group of picture parts, and determining means for comparing the quantization step of a picture part which minimizes the quantity of distortion in the group of picture parts with a reference value to select a picture part which minimizes the quantization step as the predictive picture from among the group of picture parts when the former is larger than the latter and select said picture part which minimizes the quantity of distortion when the former is equal to or smaller than the latter.

According to the device of the first aspect, since the quantization step is corrected depending on the quantity of motion, good picture quality is obtained adaptively to visual characteristics dependent on the quantity of motion. Furthermore, evaluating the magnitude of the quantity of motion according to comparison with a reference value relative to the average value enables more proper corrections.

According to the device of the second aspect, since the reference value relative to the average value is provided as a sum or a product of the average value and a constant, the magnitude of the reference value can be optimized by the simple process of appropriately setting the constant.

According to the device of the third aspect, an average of the quantity of motion for one entire picture can be utilized in the reference value without inputting the input picture twice because the average value of the quantity of motion is calculated for the entirety of the reference picture.

According to the device of the fourth aspect, the average value of the quantity of motion used for the reference value is calculated for already-coded part in the input picture. Therefore, the magnitude of the quantity of motion can be appropriately evaluated even if there is a gap of average value of the quantity of motion between the input picture and the reference picture. Furthermore, it is not necessary to input the input picture twice.

According to the device of the fifth aspect, the average value of the quantity of motion used for the reference value is calculated over both of already-coded part of the input picture and the reference picture. Accordingly, in the period shortly after the processing of one input picture is started, that is to say, in the period in which a small number of macro blocks have been already coded in the input picture, it is possible to prevent deterioration of accuracy of the average value. Furthermore, it is not necessary to input the input picture twice.

According to the device of the sixth aspect, when already-coded part in the input picture is large beyond a certain extent, the average value of the quantity of motion used in the reference value is calculated for this part. On the other hand, if it is small, it is calculated for the reference picture. Hence, in the period shortly after the processing of one input picture has been started, that is to say, in the period in which a small number of macro blocks have been coded in the input picture, it is possible to prevent deterioration of accuracy of the average value. Furthermore, it is not necessary to input each input picture twice.

According to the device of the seventh aspect, each input picture is inputted twice and an average value of quantity of motion used in the reference value is previously calculated on the basis of the first input picture. Accordingly, the quantity of motion can be properly evaluated even if there is a large difference in average value of the quantity of motion between the input picture and the reference picture.

According to the device of the eighth aspect, a correction is made using two reference values to lower the quantization step when the quantity of motion is between the reference values. Hence, visual picture quality is improved in part of picture with slow motion where deterioration of picture quality is visually noticeable. At the same time, in part of picture where motion is slow like a still state and the picture quality does not deteriorate so much owing to characteristic of the device, unnecessary correction is avoided to prevent an increase in redundancy.

According to the device of the ninth aspect, since the inter-picture coding and the intra-picture coding are selectively performed depending on the quantity of motion, good picture quality can be obtained adaptively to the visual characteristic dependent on the quantity of motion.

According to the device of the tenth aspect, the correction of quantization step is made as well as the selection of coding system depending on the quantity of motion, thus providing further excellent picture quality.

According to the device of the eleventh aspect, when correcting the quantization step, the magnitude of the quantity of motion is evaluated on the basis of comparison with a reference value relative to the average value, enabling more proper corrections.

According to the device of the twelfth aspect, when selecting a coding system, the magnitude of the quantity of motion is evaluated on the basis of comparison with a reference value relative to the average value, enabling more proper corrections.

According to the device of the thirteenth aspect, using two reference values, the inter-picture coding is selected when the quantity of motion has a value between the reference values and the intra-picture coding is selected if it takes other values. Accordingly, picture quality is properly improved in part of picture in which motion is so fast that the picture quality deteriorates due to the characteristics of the device and part of picture in which motion is so slow that the deterioration of picture quality is visually noticeable.

According to the device of the fourteenth aspect, when the quantization step of a predictive picture corresponding to a macro block of the input picture is larger than a reference value, the correction of lowering quantization step is applied to the macro block. Hence, even if the quantization step of the predictive picture is large and the quantization error is large, it is possible to prevent the large quantization error from being transmitted to coded signal. That is to say, it is possible to prevent deterioration of picture quality due to coding from being unnecessarily transmitted to the following pictures, resulting in improvement of picture quality.

According to the device of the fifteenth aspect, the quantization step in a picture region in the reference picture for which the quantization step is calculated, that is, the quantization step of the predictive picture in the fourteenth and seventeenth aspects or the picture part in the eighteenth aspect, is calculated by obtaining a weighted average of values of quantization steps of macro blocks overlapping with the picture region weighting with areas of the overlapping parts. Hence, the quantization step is properly calculated on the basis of relatively simple algorithm.

According to the device of the sixteenth aspect, the use of the reference value relative to the average value of the quantization step enables more proper evaluation of magnitude of the quantization step, resulting in further improvement of visual picture quality.

According to the device of the seventeenth aspect, when the magnitude of the quantization step of the predictive picture corresponding to a macro block of the input picture is larger than the reference value, the intra-picture coding processing is selected for that macro block. Accordingly, even if the quantization step of the predictive picture is large and the quantization error is large, it is possible to prevent the large quantization error from being transmitted to coded signal. That is to say, deterioration of picture quality caused by coding is prevented from being unnecessarily transmitted to the following pictures, resulting in improvement of picture quality.

According to the device of the eighteenth aspect, when magnitude of quantization step of part of picture in a reference picture with the smallest quantity of distortion with respect to a macro block of the input picture, i.e., of the part of the picture generally used as a predictive picture, is larger than the reference value, the picture part with the smallest quantization step is selected as a predictive picture. Accordingly, even if the quantization step of the predictive picture is large and the quantization error is large, it is possible to prevent the large quantization error from being transmitted to coded signal. That is to say, it is possible to prevent deterioration of picture quality caused by coding from being unnecessarily transmitted to the following pictures, resulting in improvement of picture quality.

Thus, it is an object of the present invention to provide a picture coding device which performs coding considering magnitude of motion vector or coding considering magnitude of quantization step of macro blocks used for prediction to improve visual picture quality.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. First Preferred Embodiment>

First, a picture coding device according to a first preferred embodiment will be described.

<1-1. Entire Device>

Figure 1:
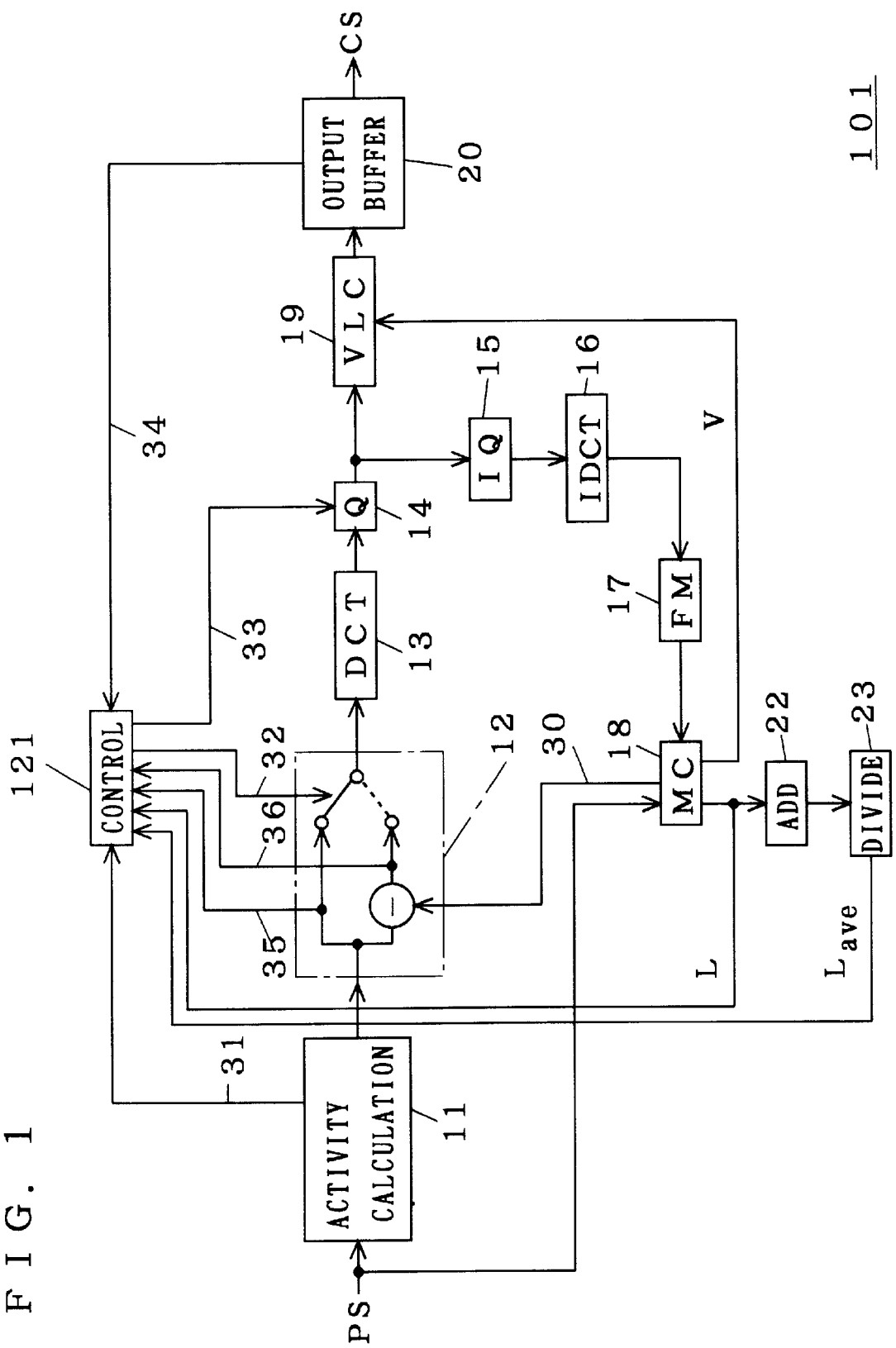
FIG. 1 is a block diagram of a device of a first preferred embodiment.
Figure 46:
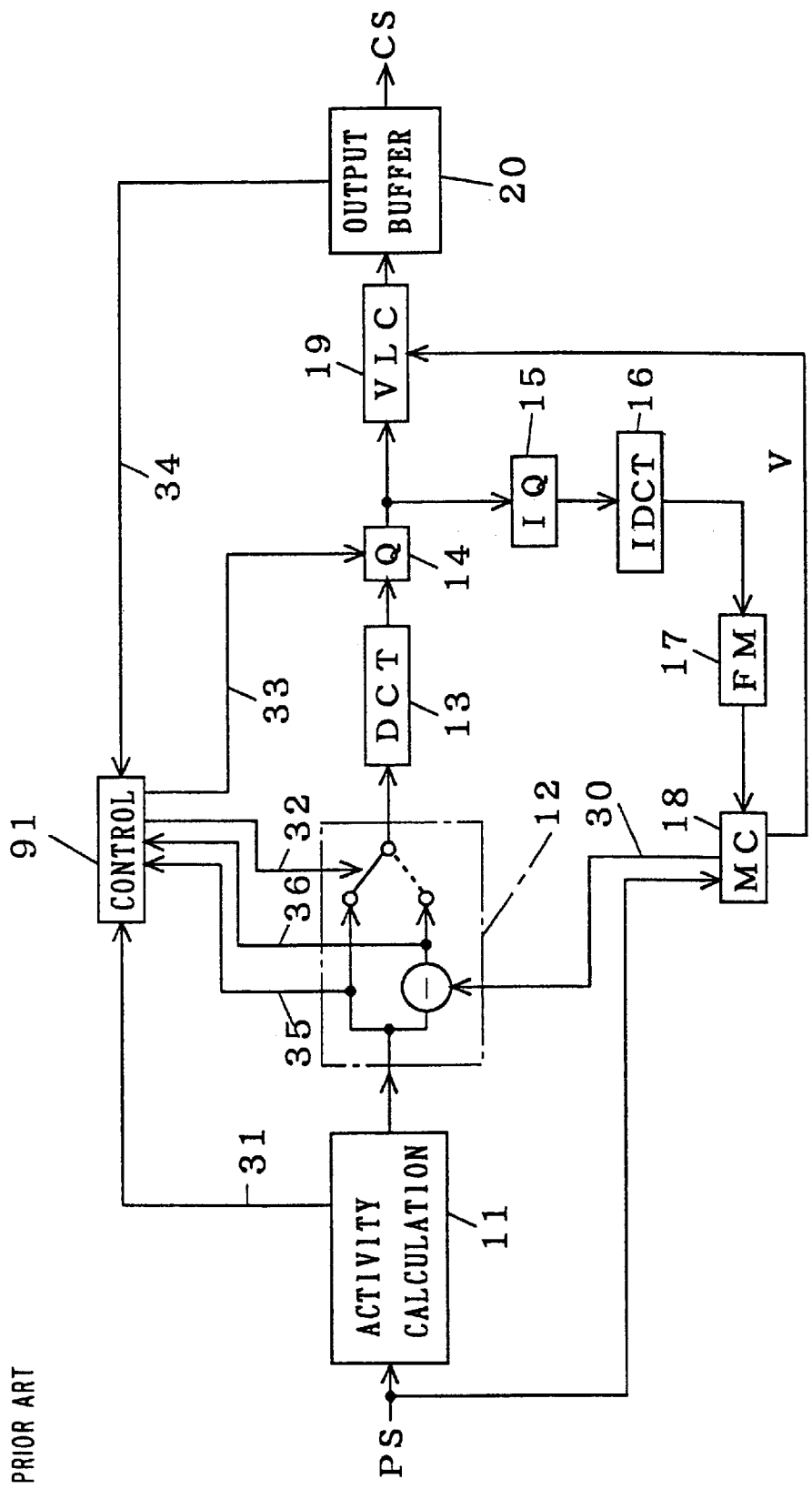
FIG. 46 is a block diagram of a conventional picture coding device.
Figure 47:
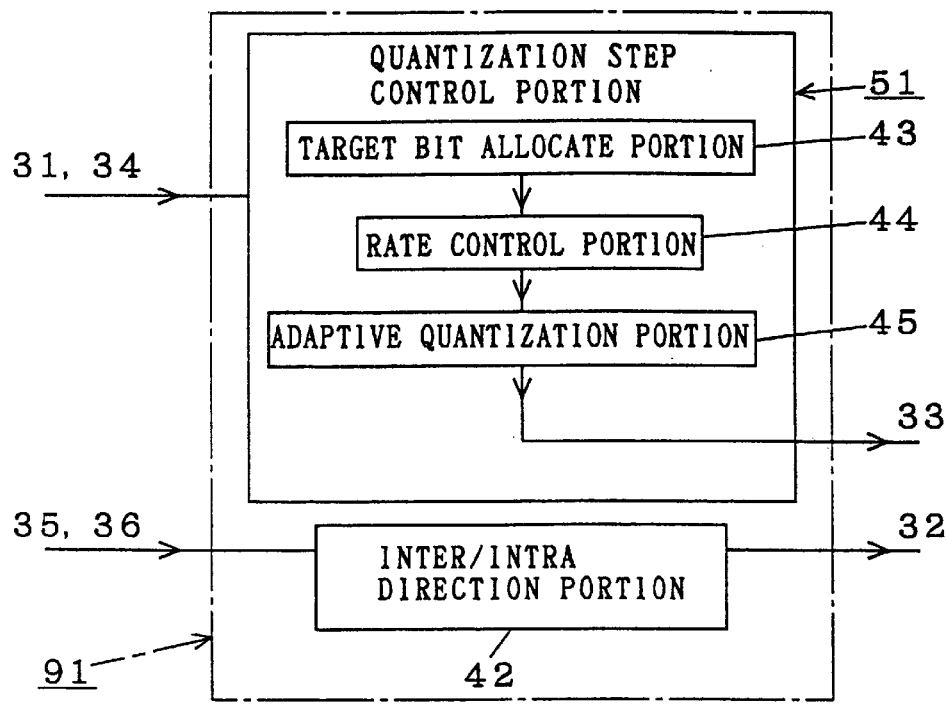
FIG. 47 is block diagram of the conventional control portion.
Figure 48:
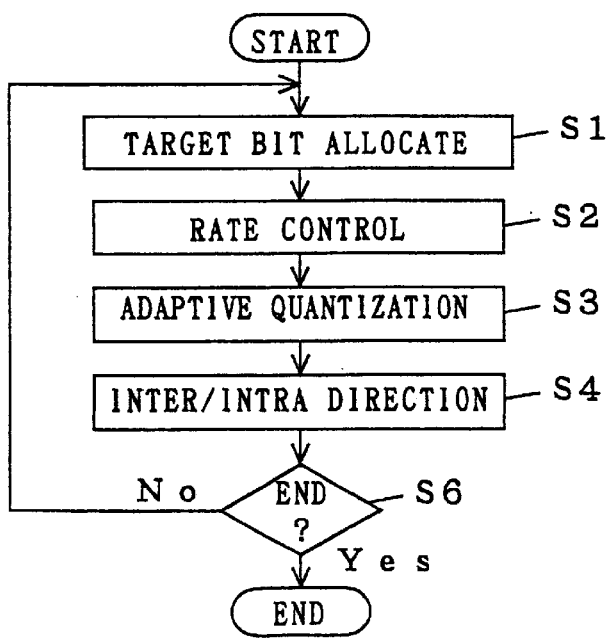
FIG. 48 is a flow chart showing the operation of the conventional control portion.

FIG. 1 is a block diagram showing the structure of a picture coding device according to this preferred embodiment. In the following diagrams, the same parts as those in the conventional device 151 shown in FIG. 46 to FIG. 48 are shown at the same reference characters and not described in detail again. This device 101 is characteristically different from the device 151 in that the control portion 91 is replaced by a control portion 121, the motion compensation portion 18 sends the quantity of motion, L, the magnitude (absolute value) of the motion vector V, to the control portion 121, and that it includes an addition portion 22 and a division portion 23.

The motion compensation portion 18 calculates the motion vector V for each macro block of the picture signal PS and also calculates its absolute value and sends it as the quantity of motion, L, to the control portion 121. The addition portion 22 adds the quantity of motion, L, one by one, for each macro block of the picture signal PS to calculate the sum total of the quantities of motion L in the picture signal PS.

The division portion 23 performs division of dividing the sum total by the number of macro blocks. The value obtained by the division corresponds to an average value of the quantities of motion, L, of the picture signal PS, that is, the average quantity of motion, $L_{ave}$. This average quantity of motion, $L_{ave}$, is sent to the control portion 121.

The average quantity of motion, $L_{ave}$, is determined after the quantities of motion, L, of all macro blocks of the picture signal PS have been calculated by the motion compensation portion 18. Accordingly, the average quantity of motion, $L_{ave}$, referred to by the control portion 121 corresponds to the average quantity of motion $L_{ave}$ of the picture signal one frame before the currently-processed picture signal PS, that is, of the reference picture stored in the frame memory 17.

<1-2. Control Portion>

Figure 2:
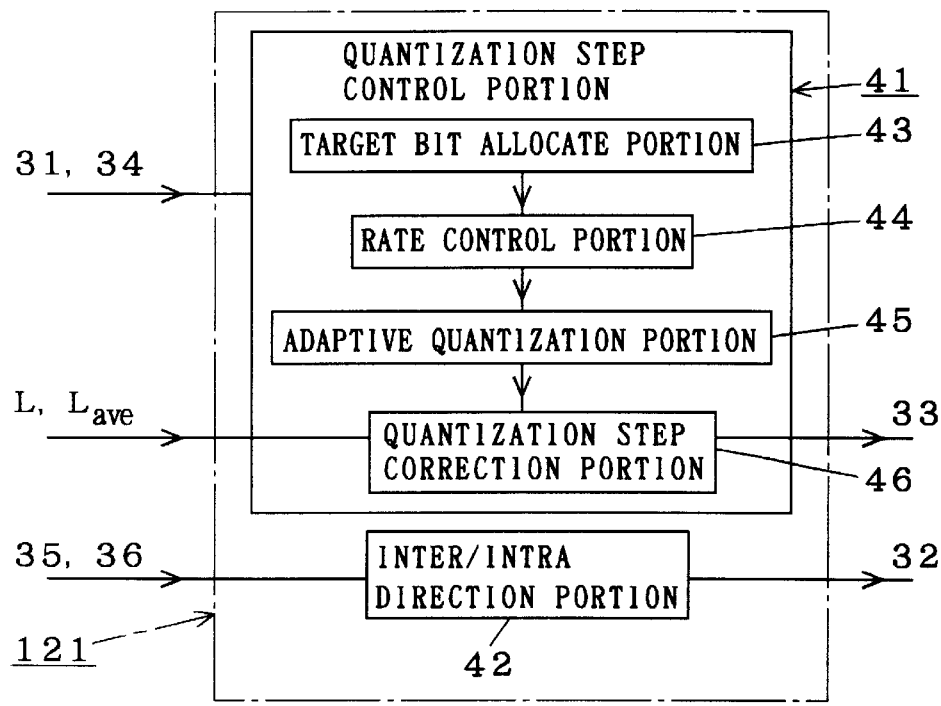
FIG. 2 is a block diagram of the control portion of the first preferred embodiment.

FIG. 2 is a block diagram showing the internal structure of the control portion 121. As shown in FIG. 2, the control portion 121 is characteristically different from the control portion 91 of the conventional device in that the quantization step control portion 41 includes a quantization step correction portion 46. In the quantization step correction portion 46, the value of the quantization step set in the adaptive quantization portion 45 is corrected on the basis of the quantity of motion L sent from the motion compensation portion 18 and the average quantity of motion $L_{ave}$ sent from the division portion 23. Then a quantization step direction signal 33 corresponding to the corrected quantization step is sent to the quantization portion 14.

Figure 3:
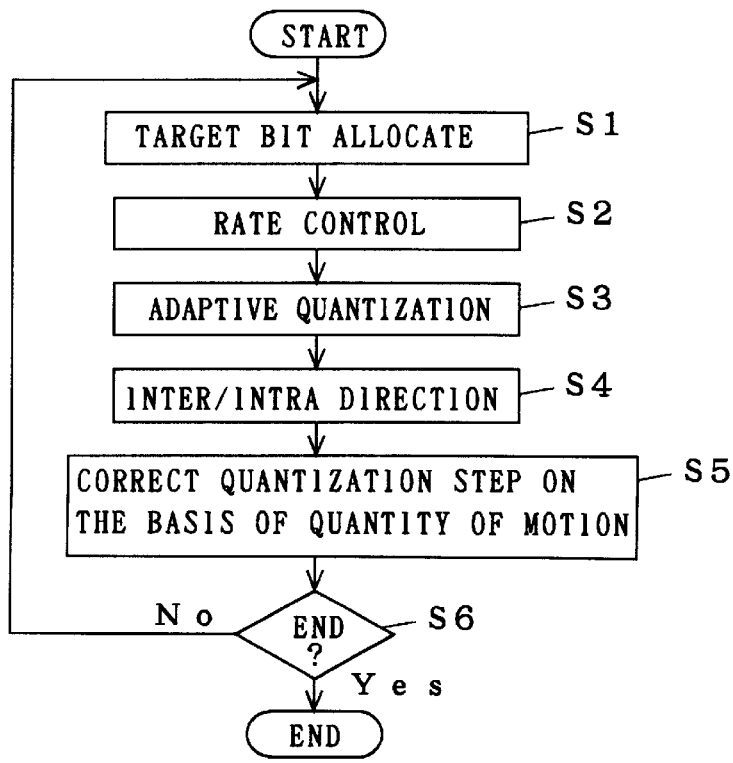
FIG. 3 is a flow chart showing the operation of the control portion of the first preferred embodiment.

FIG. 3 is a flow chart showing the flow of operation of the control portion 121. The control portion 121 repeatedly conducts the processing in Steps S1 to S6 for each macro block. When the processing is started, first, the processing in Steps S1 to S4 is executed similarly to that by the control portion 91 (Steps S1 to S4 in FIG. 48.) As a result, operation of the switch portion of the switching portion 12 is determined and a quantization step value is determined as a temporary value.

Then in Step S5, the value of the quantization step as a temporary value is corrected on the basis of the quantity of motion L. That is to say, the correction coefficient modified in Step S4 is further changed. This processing is executed in the quantization step correction portion 46.

Next, the processing moves to Step S6 to determine whether to terminate the processing. If it is determined to terminate, the processing terminates. On the other hand, if it is determined that the processing should not be terminated because there exist some more macro blocks to be processed, for example, the processing returns to Step S1 and the processing in and after Step S1 is applied to the next macro block. This way the processing is successively applied to all macro blocks.

Figure 4:
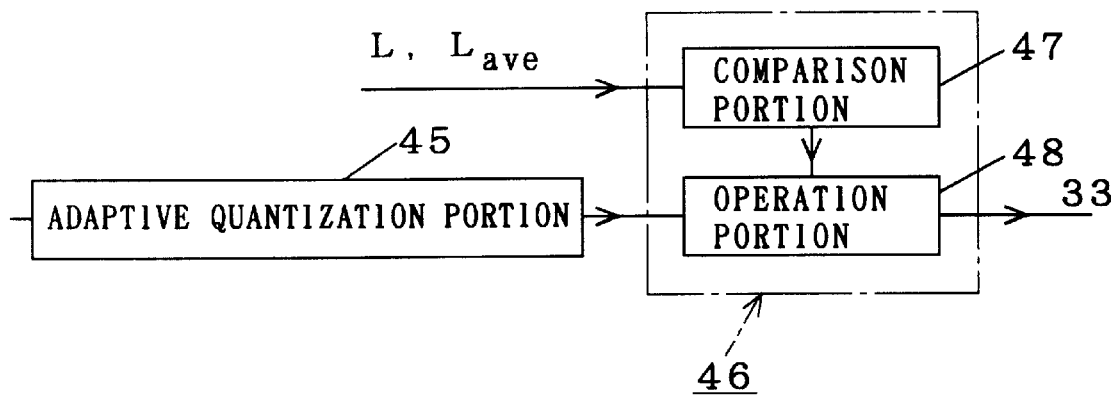
FIG. 4 is a block diagram of the quantization step correction portion of the first preferred embodiment.

FIG. 4 is a block diagram showing the internal structure of the quantization step correction portion 46. As shown in FIG. 4, the quantization step correction portion 46 includes a comparison portion 47 and an operation portion 48. The flow of operation of the quantization step correction portion 46 having these components, in other words, the internal flow of Step S5 shown in FIG. 3 is shown in the flow chart of FIG. 5.

Figure 5:
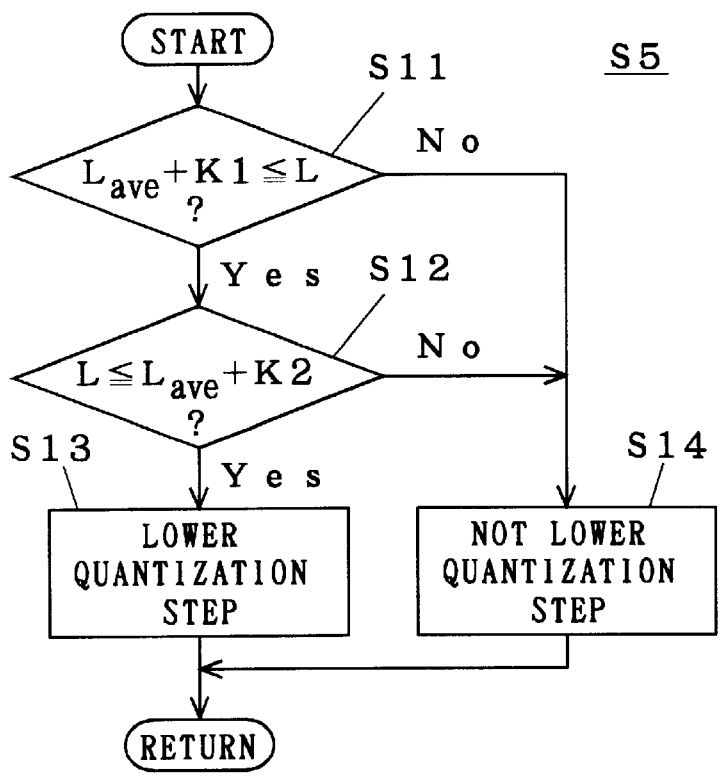
FIG. 5 is a flow chart showing the operation of the correction portion of FIG. 4.

When the processing in Step S5 is started, first, in Step S11, the quantity of motion L is compared with a reference value relative to the average quantity of motion $L_{ave}$. As illustrated in FIG. 5, a value obtained by adding a certain constant K1 to the average quantity of motion $L_{ave}$ is used as the reference value. Then if the quantity of motion L is equal to or larger than the reference value, the processing moves to Step S12, and if it is smaller than the reference value, the processing moves to Step S14.

In Step S12, the quantity of motion L is compared with another reference value relative to the average quantity of motion $L_{ave}$. As the reference value, as illustrated in FIG. 5, a value obtained by adding another certain constant K2 to the average quantity of motion $L_{ave}$ is used. This reference value is set to a larger value than the reference value in Step S11. That is to say, the two constants K1 and K2 are set so that constant K1<constant K2.

If it is determined in Step S12 that the quantity of motion L is equal to or smaller than the reference value, the processing moves to Step S13, and if it is larger than the reference value the processing moves to Step S14. The processing in Steps S11 to S12 is executed in the comparison portion 47.

In the following Step S13, the quantization step direction signal 33 is calculated to make a correction of lowering the value of the quantization step determined in the adaptive quantization portion 45, that is, lowering the quantization step as a temporary value, and it is sent to the quantization portion 14. When the processing in Step S13 is ended, the processing in Step S5 is ended.

In Step S14 which is performed alternatively to Step S13, the quantization step direction signal 33 calculated in the adaptive quantization portion 45 is intactly sent to the quantization portion 14 without corrected. In other words, the quantization step direction signal 33 is sent out so that the quantization is carried out without correcting the quantization step determined in the adaptive quantization portion 45, that is, the quantization step as a temporary value. The processings in Steps S13 and S14 are executed in the operation portion 48 (FIG. 4.)

<1-3. Characteristic Operation and Advantage of the Device>

Figure 6:
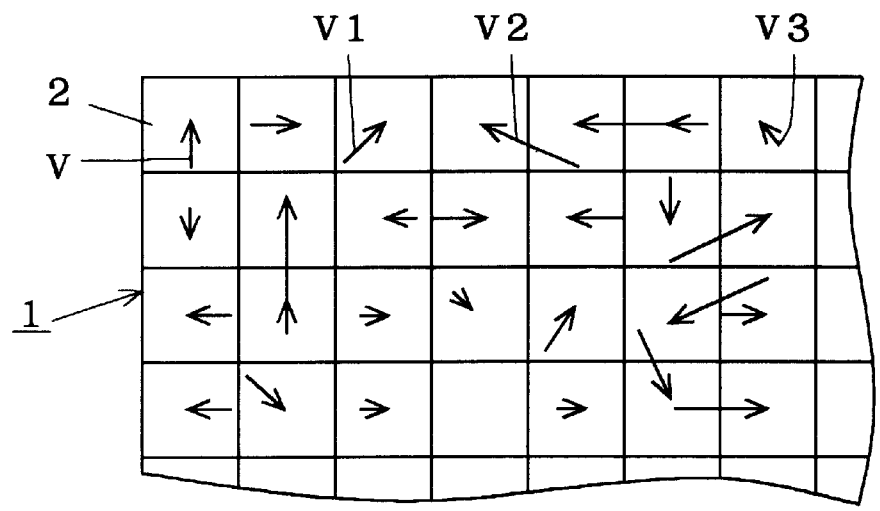
FIG. 6 is a diagram for describing operation of the device of the first preferred embodiment.

This way, in the device 101, quantization is applied with a small quantization step to macro blocks whose quantity of motion L corresponds to intermediate values in a certain range defined by the two reference values and the quantization is applied with a conventional quantization step to other macro blocks. FIG. 6 is a schematic diagram for describing this characteristic operation.

As shown in FIG. 6, a picture 1 (a piece of picture) represented by the picture signal PS is divided into macro blocks 2 composed of a certain number (16×16, for example) of pixels. In the motion compensation portion 18, motion vector V is determined for each macro block 2. The algorithm for determining the motion vector V will be described later. The control portion 121 receives information on the quantity of motion L, or the magnitude of the motion vector V, for each macro block and classifies the magnitude of the quantity of motion L on the basis of the above-described two reference values.

Since the motion vector V1 illustrated in FIG. 6 has an intermediate size, the macro block to which the motion vector V1 belongs is quantized with a lowered quantization step. Another motion vector V2 illustrated in FIG. 6 is so large that the macro block to which the motion vector V2 belongs is quantized with a conventional quantization step, i.e., a relatively large quantization step. Since still another motion vector V3 illustrated in FIG. 6 is so small that the macro block to which the motion vector V3 belongs is quantized with a conventional quantization step.

This way, the quantization is performed with a conventional quantization step to macro blocks moving faster than a certain reference value ($L_{ave}$+K2) and the quantization is performed with a quantization step downwardly corrected below the conventional value to macro blocks moving slower than the reference value ($L_{ave}$+K2.) That is to say, deterioration of picture quality in slowly moving macro blocks is suppressed by increasing the amount of the signal allotted.

Accordingly, deterioration of picture quality is suppressed low in part of picture in which motion is slow and deterioration of picture quality is noticeable, resulting in improvement of visual picture quality. At the same time, since picture quality of part of the picture where motion is fast and deterioration of visual picture quality is not noticeable is not unnecessarily improved, redundancy of the coded signal CS is not unnecessarily increased.

Furthermore, owing to characteristic of the device, the picture quality is not deteriorated so much when motion of picture is slow enough, like a still state. Utilizing this characteristic, the device 101 makes a comparison with another reference value ($L_{ave}$+K1) and applies quantization with a conventional quantization step, which is not downwardly corrected, to macro blocks with such slow motion as falls below this reference value. The device 101 suppresses an increase of redundancy of the coded signal CS in this respect too.

This way, the device 101 which performs quantization on the basis of the quantity of motion L realizes such coding as provides high visual picture quality while suppressing an increase in redundancy. Moreover, even if the magnitude of motion of the entire picture 1 changes, the reference value can follow the change because the device 101 uses the values relative to the average quantity of motion $L_{ave}$ as the reference values.

Hence, macro blocks are always classified in any pictures 1, providing the advantage of further improving the picture quality. For example, such an inconvenience is avoided that all macro blocks are quantized with downwardly uncorrected quantization step or all macro blocks are quantized with downwardly corrected quantization step.

<1-4. Modification of Comparison Portion>

Figure 7:
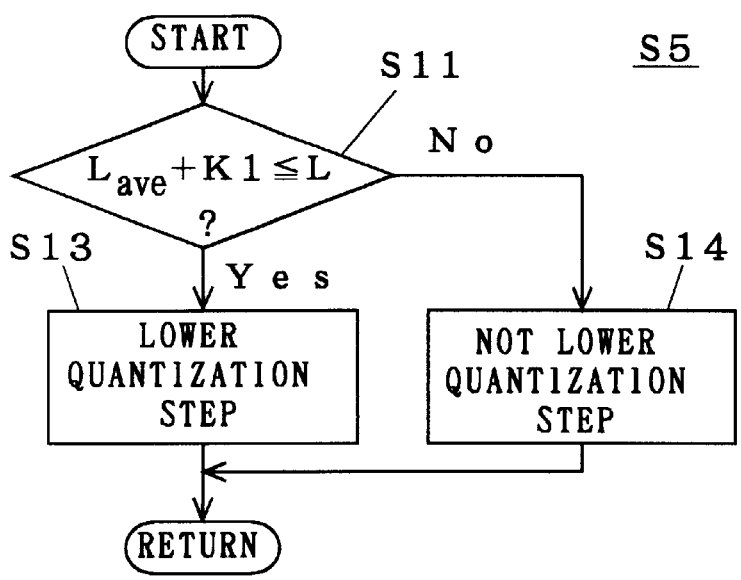
FIG. 7 is a flow chart showing the operation of a modification of the correction portion.
Figure 8:
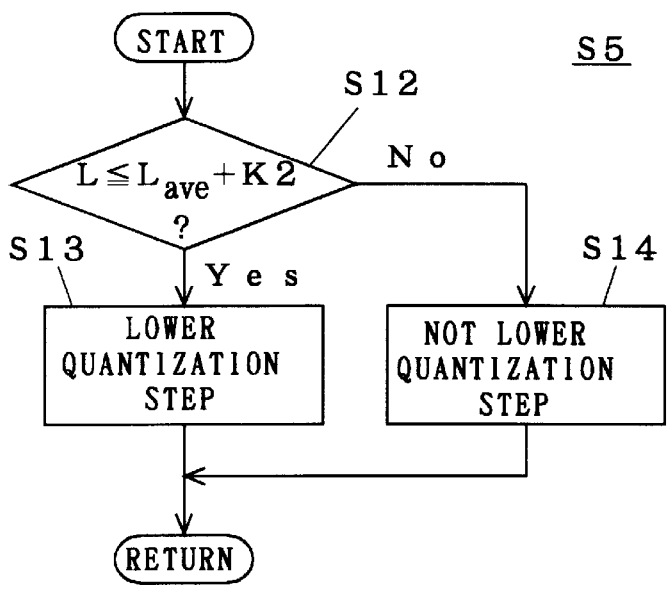
FIG. 8 is a flow chart showing the operation of another modification of the correction portion.

Although FIG. 5 has shown an example in which the quantity of motion L is classified on the basis of the two reference values, a commensurate effect is obtained when they are classified by using only one of the two reference values. FIG. 7 and FIG. 8 show flow charts showing the examples.

In the example shown in FIG. 7, Step S11 only is carried out in the two comparing processes in the procedure in FIG. 5. Accordingly, while suppressing an increase in redundancy in part of picture where motion is so slow like a still state and the picture quality does not deteriorate so much, the visual picture quality is improved in part of picture where motion is faster and deterioration of visual picture quality is noticeable.

On the other hand, in the example shown in FIG. 8, Step S12 only is carried out in the two comparing processes in the procedure in FIG. 5. Then while improving the visual picture quality in part of picture where motion is slow and deterioration of visual picture quality is noticeable, an increase in redundancy is suppressed in part of picture where motion is fast and deterioration of visual picture quality is not noticeable.

<2. Second Preferred Embodiment>

In the first preferred embodiment, the average quantity of motion, $L_{ave}$, which the quantization step correction portion 46 refers to corresponds to the picture signal one frame before the currently-processed picture signal PS, i.e., the average quantity of motion $L_{ave}$ of the reference picture stored in the frame memory 17. However, a value defined in a different form from the average quantity of motion $L_{ave}$ of the reference picture may be used as the average quantity of motion $L_{ave}$ in the quantization step correction portion 46. Now, some of the examples will be described.

<2-1. First Example>

In a first example, the quantization step correction portion 46 refers to an average value of the quantity of motion L of macro blocks in the currently-processed picture signal PS which have been already subjected to the search of predictive picture 30 and the calculation of the motion vector V (and the quantity of motion L) in the motion compensation portion 18, i.e., the macro blocks which have been already processed by the motion compensation portion 18, as the average quantity of motion $L_{ave}$.

Accordingly, the addition portion 22 in FIG. 1 calculates the sum total of the quantities of motion L of already-processed macro blocks of the currently-processed picture signal PS one by one every time the motion compensation portion 18 outputs the quantity of motion L for each macro block and transmits it to the division portion 23.

The division portion 23 executes the operation of dividing the sum total transmitted from the addition portion 22 by the number of already-processed macro blocks in the currently processed-picture signal PS one by one and outputs the obtained value one by one as the average quantity of motion $L_{ave}$. Hence, the division portion 23 outputs the average value of the quantities of motion L of the macro blocks which have been already processed by the motion compensation portion 18 in the currently processed picture signal PS. The quantization step correction portion 46 of the control portion 121 refers to this average quantity of motion $L_{ave}$.

In this example, referring to the average value of quantities of motion L of the currently processed picture signal PS itself as the average quantity of motion $L_{ave}$, the device 101 provides the advantage of preventing deviation of determination in the quantization step correction portion 46 when the average quantity of motion $L_{ave}$ largely differs between the picture signal PS and the reference picture.

<2-2. Second Example>

In a second example, the quantization step correction portion 46 refers to an average value of quantities of motion L for one frame to two frames, i.e. the reference picture plus already processed macro blocks in the currently processed picture signal PS. That is to say, the average value of quantities of motion L in the range from the macro block newly processed in the motion compensation portion 18 to the preceding one to two frames is referred to as the average quantity of motion $L_{ave}$.

Accordingly, in FIG. 1, the addition portion 22 stores the sum total of quantities of motion L of the already processed picture signal PS one frame before the currently processed picture signal, in other words, the sum total of the quantities of motion L of the reference picture and adds the quantity of motion L one by one to the stored sum total value every time the motion compensation portion 18 outputs the quantity of motion L for each macro block. Hence, the sum total of the quantities of motion L of the reference picture plus the quantities of motion L of all of already processed macro blocks of the currently processed picture signal PS is calculated. The value obtained by the addition is transferred one by one to the division portion 23.

The division portion 23 performs the operation of dividing the sum total transmitted from the addition portion 22 one by one by the number of the already processed macro blocks in the presently processed picture signal PS plus the number of macro blocks for one frame and outputs the value obtained by the operation as the average quantity of motion $L_{ave}$ one by one. Accordingly, the division portion 23 outputs an average value of the quantities of motion L for one to two frames from the reference picture to the already processed macro blocks of the currently processed picture signal PS as the average quantity of motion $L_{ave}$. The quantization step correction portion 46 of the control portion 121 refers to this average quantity of motion $L_{ave}$.

In this example, referring to the average quantity of the quantities of motion L of the entirety of the presently processed picture signal PS plus the reference picture as the average quantity of motion $L_{ave}$, the device 101 provides the advantage of preventing deterioration of accuracy of the average quantity of motion $L_{ave}$ shortly after the processing of the picture signal PS has been started, that is, in the period in which a small number of macro blocks have been processed.

<2-3. Third Example>

In a third example, the quantization step correction portion 46 selects one of the average value of the quantities of motion L in the reference picture and the average value of the quantities of motion L of already processed macro blocks in the presently processed picture signal PS depending on the number of already processed macro blocks and refers to it as the average quantity of motion $L_{ave}$. Hence, the control portion 121 is replaced by the control portion 122 shown in the block diagram of FIG. 9. This control portion 122 is characteristically different from the control portion 121 of FIG. 2 in that it includes a selecting portion 40. The selecting portion 40 is interposed between the signal line transmitting the quantity of motion L and the average quantity of motion $L_{ave}$ and the quantization step correction portion 46.

Figure 9:
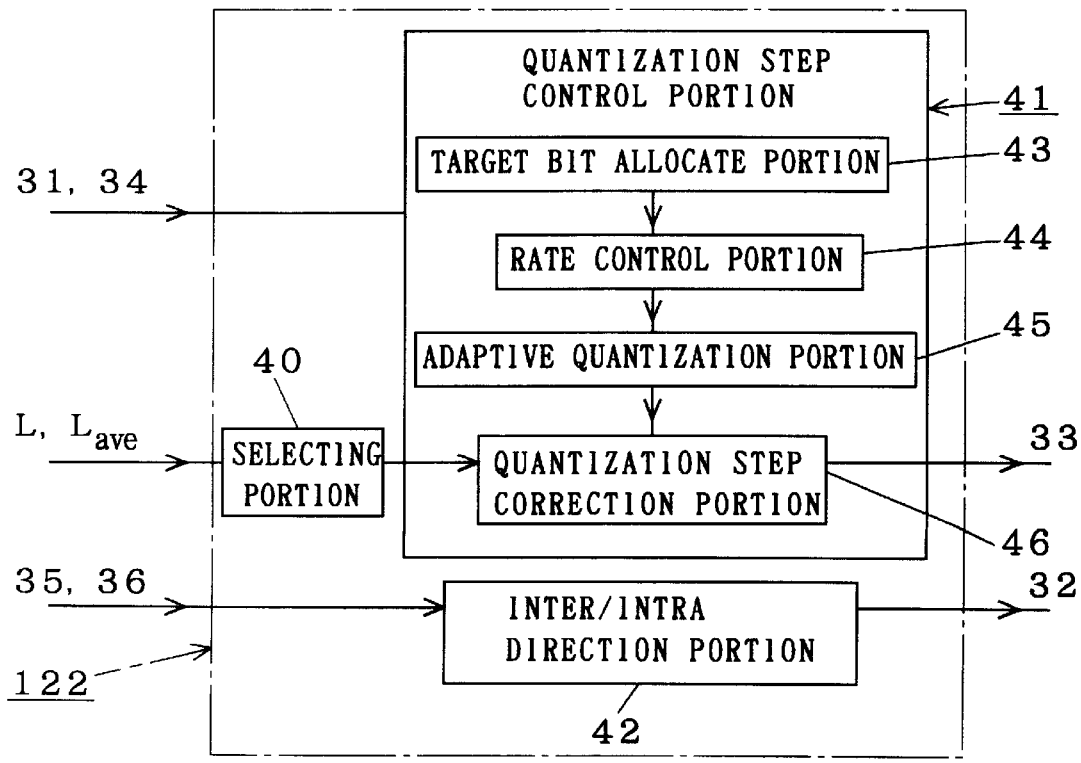
FIG. 9 is a block diagram of the control portion of a second preferred embodiment.
Figure 10:
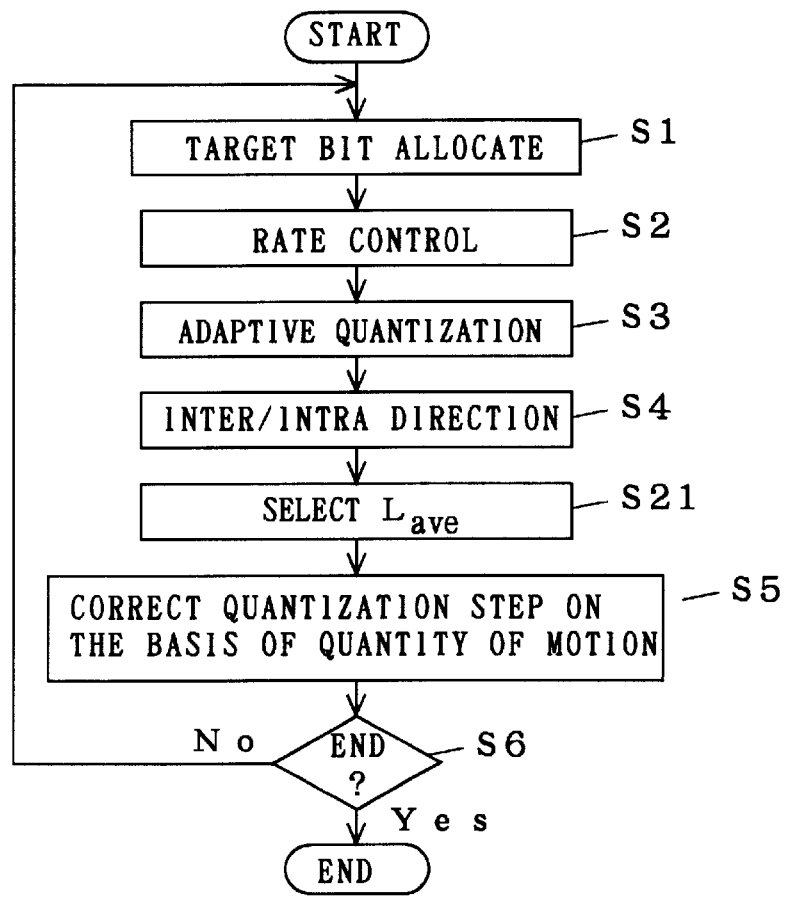
FIG. 10 is a flow chart showing the operation of the control portion of the second preferred embodiment.

FIG. 10 is a flow chart showing the flow of operation of the control portion 122 shown in FIG. 9. Similarly to FIG. 2, each step is executed repeatedly for each macro block. When the processing is started, first, the processing in Steps S1–S4 is executed like the processing by the control portion 91 (Steps S1–S4 of FIG. 48.) As a result, operation of the switch of the switching portion 12 is determined and the value of the quantization step is determined as a temporary value.

Then in Step S21, the process of selecting the average quantity of motion $L_{ave}$ is executed. This processing is accomplished by the selecting portion 40. The flow chart of FIG. 11 shows the internal flow of Step S21.

Figure 11:
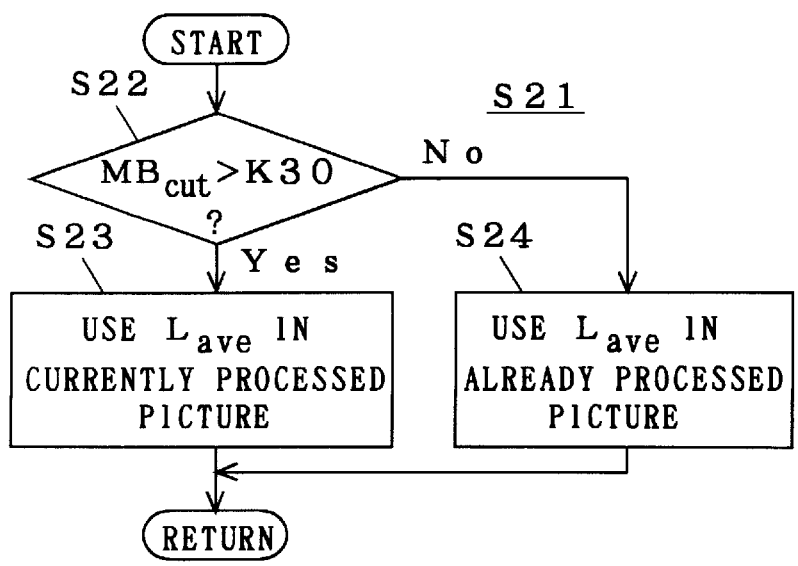
FIG. 11 is a diagram showing the internal flow of Step S21 of FIG. 10.

As shown in FIG. 11, when the processing in Step S21 is started, first, in Step S22, the number $MB_{cut}$ of already processed macro blocks in the currently processed picture signal PS is compared with a certain constant K30 as a reference value. If the number $MB_{cut}$ of the already processed blocks is larger than the constant K30, the processing moves to Step S23 and if it is equal to or smaller than the constant K30, it moves to Step S24.

In Step S23, the average value of quantity of motion L of the macro blocks already processed in the present object picture signal PS is selected as the average quantity of motion $L_{ave}$. In Step 24 executed alternatively to Step S23, the average value of the quantities of motion L of the already processed picture signal PS one frame before, i.e., the reference picture, is selected as the average quantity of motion $L_{ave}$. When these processes have been finished, the processing in Step S21 is finished.

In order to select the two kinds of average values in the selecting portion 40, the division portion 23 outputs the average value of quantity of motion L of the already processed macro blocks in the currently processed picture signal PS one by one every time a macro block is processed, like the first example explained above, for example. Furthermore, the selecting portion 40 stores the average value of the quantities of motion L of the already processed picture signal PS one frame before and one of the two kinds is selected as the average quantity of motion $L_{ave}$.

Referring to FIG. 10 again, when the processing in Step S21 ends, the processing moves to Step S5. In Step S5, the processing in FIG. 5, FIG. 7 or FIG. 8 is conducted by the quantization step correction portion 46 by using the average quantity of motion $L_{ave}$ selected in Step S21.

Next, the processing moves to Step S6 and if it is determined that the processing should be terminated, the processing ends. When it is determined that the processing should not be terminated, the processing returns to Step S1 and the processing in and after Step S1 is applied to the next macro block.

In this third example, the average quantity of motion $L_{ave}$ in the picture signal PS and the average quantity of motion $L_{ave}$ in the reference picture are selectively referred to depending on the number of already processed macro blocks in the currently processed picture signal PS. Therefore it has the advantage of preventing deterioration of accuracy of the average quantity of motion $L_{ave}$ in the period shortly after the processing of the picture signal PS has been started, similarly to the second example.

<2-4. Fourth Example>

In a fourth example, the quantization step correction portion 46 refers to an average value of the quantity of motion L over all macro blocks in the picture signal PS currently processed. For this, in FIG. 1, the same picture signal PS is inputted twice to the motion compensation portion 18. When it is inputted first, the input picture signal PS is not processed on the downstream at least of the switching portion 12 (DCT 13, quantization portion 14, etc.) Accordingly, in this period, the reference picture stored in the frame memory 17 is not updated. The normal processing is applied to the picture signal PS inputted at the second time.

The motion compensation portion 18 processes the picture signal PS twice. When the processing to the picture signal PS inputted first is finished, the average value of quantities of motion L over the entire picture signal PS is outputted as the average quantity of motion $L_{ave}$ from the division portion 23. This average quantity of motion $L_{ave}$ is referred to in the quantization step correction portion 46 in the normal processing applied to the picture signal PS inputted at the second time.

This way, the average value of the quantities of motion L over the entirety of the currently processed picture signal PS is used as the average quantity of motion $L_{ave}$. Accordingly, the fourth example, though it requires the additional procedure of inputting the picture signal PS again, provides the advantage that accuracy of determination in the quantization step correction portion 46 can be maintained high even if the average quantity of motion $L_{ave}$ largely differs between the picture signal PS and the reference picture. At the same time, regardless of the number of already processed macro blocks, the accuracy of the determination can be maintained high.

Although FIG. 11 shows an example in which the number $MB_{cut}$ of the already processed macro blocks is compared with the reference value, the number of already processed slices may be compared with another reference value. The slice is a conventionally known concept which indicates a component of the picture signal composed of a plurality of macro blocks consecutive in the scanning direction.

<3. Third Preferred Embodiment>

Figure 12:
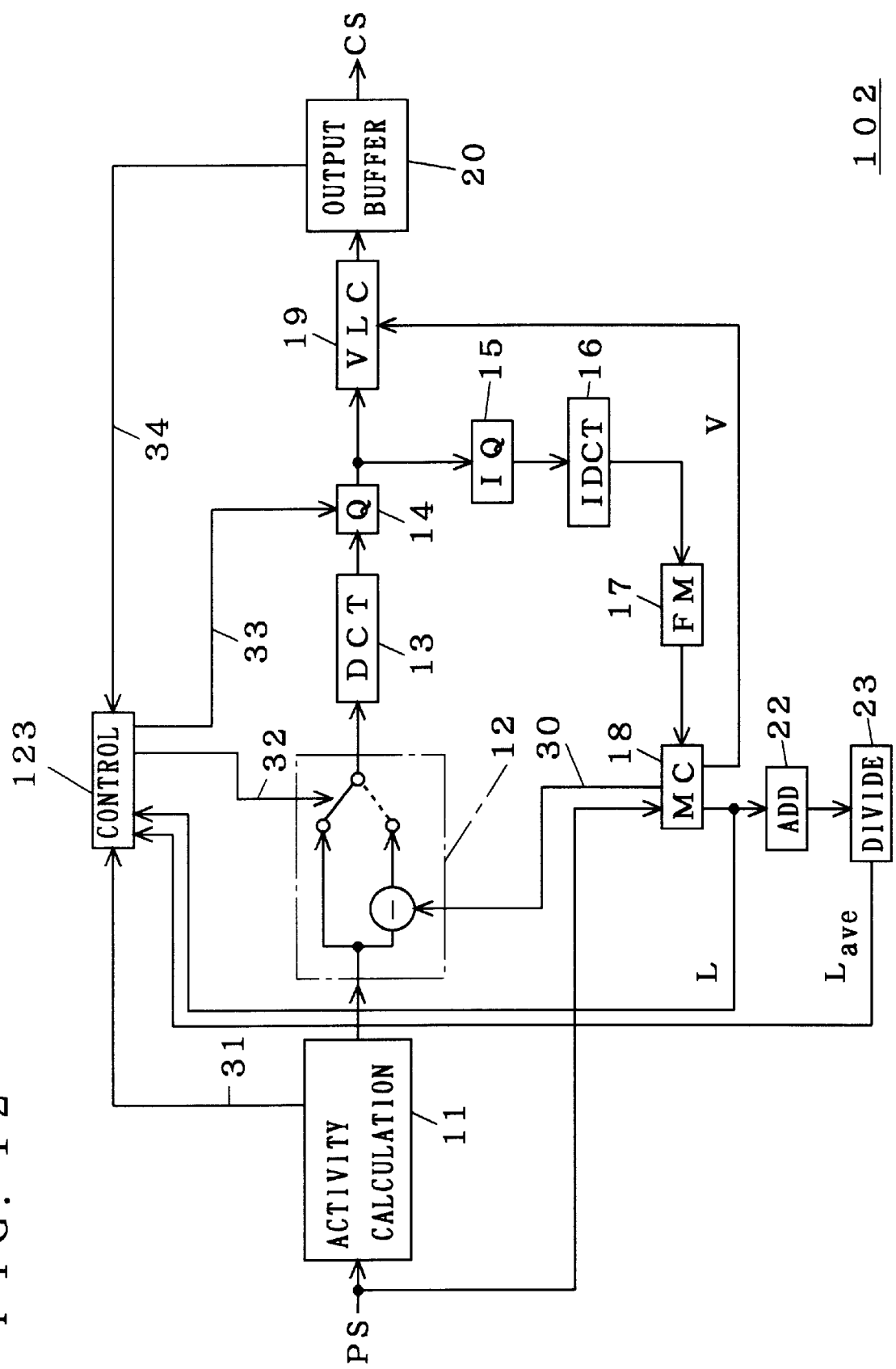
FIG. 12 is a block diagram of a device according to a third preferred embodiment.
Figure 13:
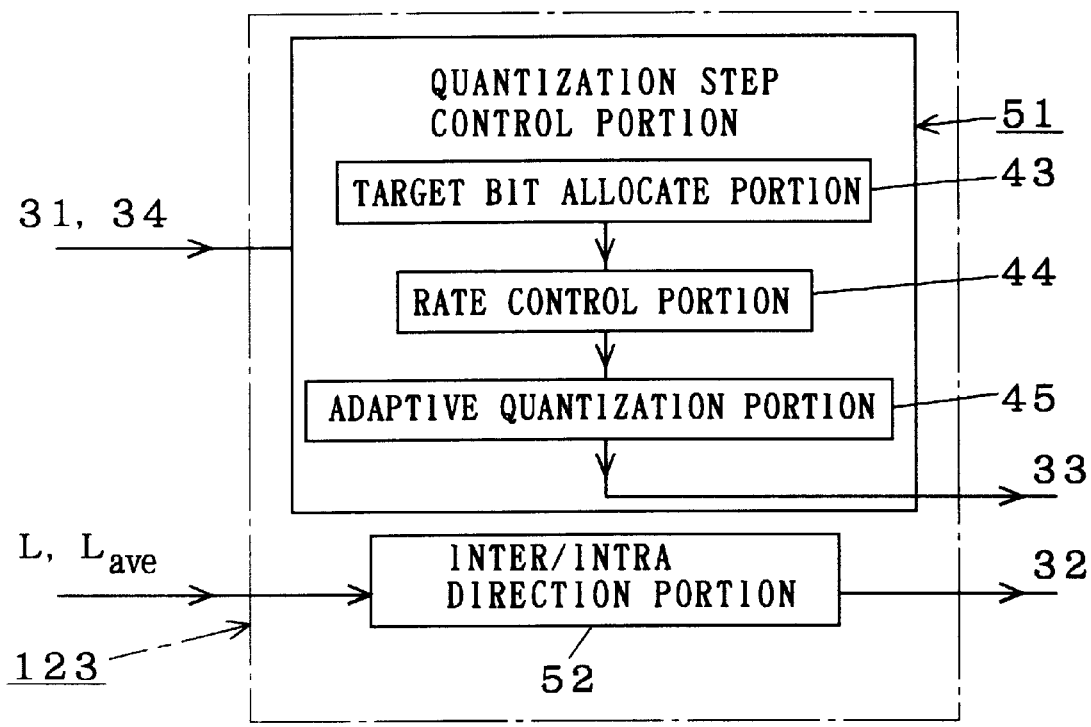
FIG. 13 is a block diagram of the control portion of the third preferred embodiment.

FIG. 12 is a block diagram showing the structure of a picture coding device according to a third preferred embodiment. The control portion 123 of this device 102 outputs the selection signal 32 to the switching portion 12 without referring to either of the non-differential picture 35 and the differential picture 36. FIG. 13 is a block diagram showing the internal structure of the control portion 123. As shown in FIG. 13, the quantization step control portion 51 of the control portion 123 is structured in the same way as the corresponding part of the conventional device 151. Unlike the indication portion 42 of FIG. 2, the inter/intra direction portion 52 of the control portion 123 is fed with the quantity of motion L and the average quantity of motion $L_{ave}$.

Figure 14:
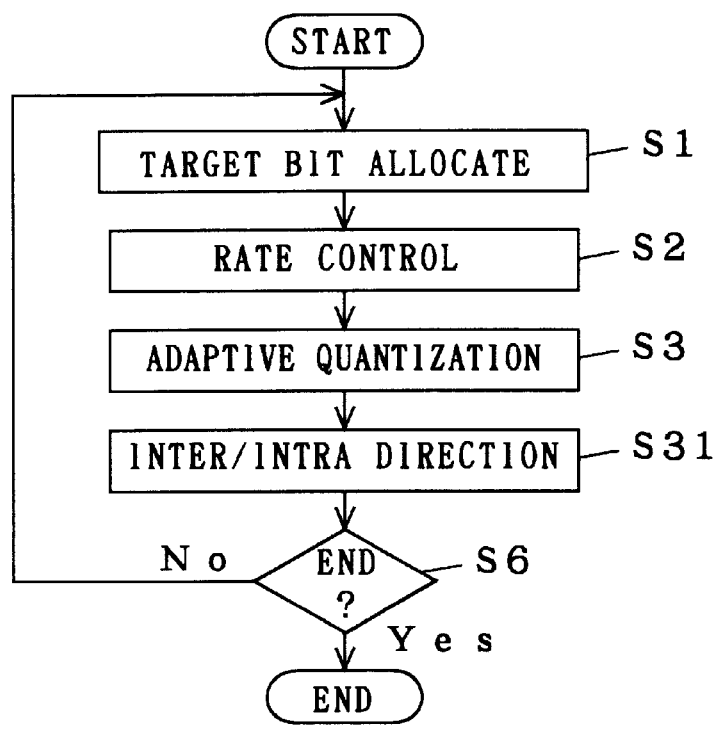
FIG. 14 is a flow chart showing the operation of the control portion of the third preferred embodiment.

FIG. 14 is a flow chart showing the flow of operation of the control portion 123. The processing in each step is repeatedly executed for each macro block, like those of FIG. 2. When the processing is started, first, the processing in Steps S1 to S3 is executed similarly to the processing of the control portion 91 (Steps S1 to S3 of FIG. 48.) As a result, the value of the quantization step is determined. The quantization step is settled in this step.

Subsequently, in Step S31, the processing for directing inter/intra is executed. In this processing, it is determined which of the inter-coding and the intra-coding is to be selected by referring to the quantity of motion L and the average quantity of motion $L_{ave}$ and a selection signal 32 corresponding to the determination is sent to the switching portion 12. This processing is accomplished by the inter/intra direction portion 52.

Next, the processing moves to Step S6 and the process terminates when it is determined to be terminated. When it is determined that the process should not be terminated, the process returns to Step S1 and the processing in and after Step S1 is applied to the next macro block.

Figure 15:
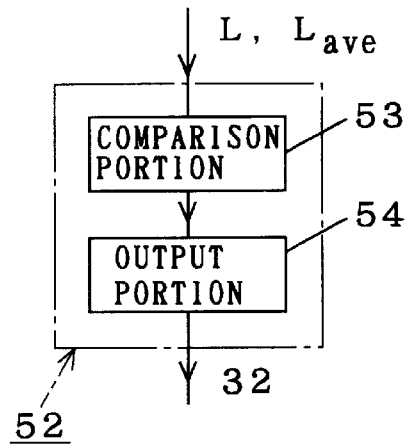
FIG. 15 is a block diagram of the inter/intra direction portion of FIG. 13.

FIG. 15 is a block diagram showing the internal structure of the inter/intra direction portion 52. The inter/intra direction portion 52 includes a comparison portion 53 and an output portion 54. An example of flow of operation of the inter/intra direction portion 52 having these elements, in other words, an example of internal flow of Step S31 shown in FIG. 14 is shown in the flow chart of FIG. 16.

When the processing in Step S31 is started, in Step S32, first, the quantity of motion L is compared with two kinds of reference values relative to the average quantity of motion $L_{ave}$. As illustrate in FIG. 16, these reference values are obtained by adding a certain constant K20 and a certain constant K21 larger than that to the average quantity of motion $L_{ave}$.

If the quantity of motion L has a value in the range between the reference values, the processing moves to Step S33, and if it is out of the range, it moves to Step S34. The processing in Step S32 is accomplished by the comparison portion 53. The determination made in one step like Step S32 is substantially the same as the determination made in two steps like Steps S11 and S12 shown in FIG. 5.

In Step S33, a signal directive of the inter-coding is outputted as the selection signal 32, and in Step S34, a signal directive of the intra-coding is outputted. When the processings in these Steps S33 and S34 have been finished, the processing in the entire Step S31 finishes. The processings in Steps S33 and S34 are both performed in the output portion 54.

As described above, the device 102 applies inter-coding to macro blocks with the quantity of motion L corresponding to intermediate values in a certain range defined by the two reference values and applies intra-coding to other macro blocks. Hence, deterioration of picture quality is suppressed low in part of picture where motion is slow and deterioration of picture quality is visually noticeable. At the same time, simple processing is selected for part of picture where motion of picture is slow enough not to deteriorate the picture quality so much due to characteristic of the device.

Furthermore, the use of the values relative to the average quantity of motion $L_{ave}$ as reference values allows the reference values to follow a change in magnitude of motion of the entire picture of the picture signal PS. Accordingly, all picture signals PS can be properly classified.

Figure 16:
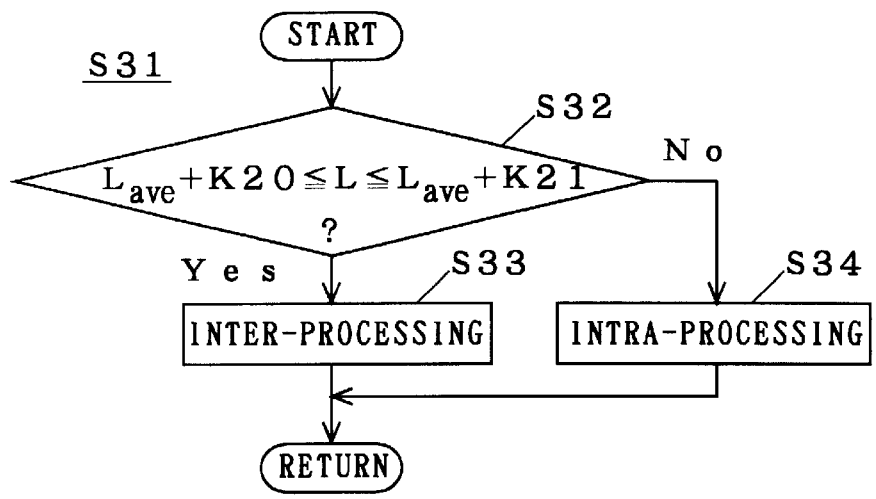
FIG. 16 is a diagram showing the internal flow of Step S31 of FIG. 14.
Figure 17:
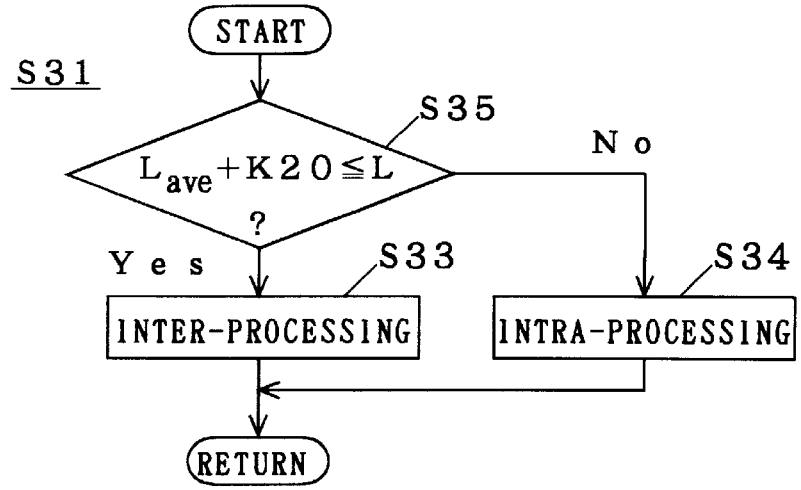
FIG. 17 is a flow chart showing a modification of FIG. 16.
Figure 18:
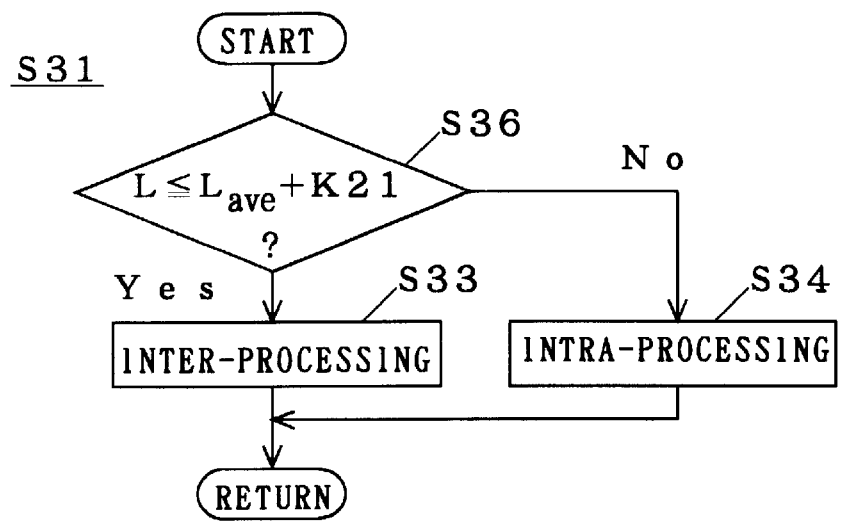
FIG. 18 is a flow chart showing another modification of FIG. 16.

Although FIG. 16 shows an example in which the quantities of motion L are classified on the basis of the two reference values, classifying them using only one of the two reference values provides a commensurate effect, similarly to FIG. 7 and FIG. 8. FIG. 17 and FIG. 18 are flow charts showing the examples.

In the example shown in FIG. 17, the smaller one of the two reference values in the procedure of FIG. 16 is compared with the quantity of motion L. Accordingly, the processing is simplified with part of picture where motion is slow like a still state and picture quality does not deteriorate much and visual picture quality is improved in part of picture where motion is faster and deterioration of visual picture quality is noticeable.

On the other hand, in the example shown in FIG. 18, the larger one of the two reference values in FIG. 16 is compared with the quantity of motion L. Then the visual picture quality is improved in part of picture where motion is slow and deterioration of visual picture quality is noticeable.

<4. Fourth Preferred Example>

It is also possible to construct a device which simultaneously realizes both of the feature of the first preferred embodiment, the "correction of quantization step based on the quantity of motion" and the feature of the third preferred embodiment, the "inter/intra direction based on the quantity of motion." Here a picture coding device constructed that way will be described. The entire structure of this device is represented the same as the block diagram of FIG. 12 except that the control portion 123 is replaced by a control portion 124 having the internal structure shown in FIG. 19.

Figure 19:
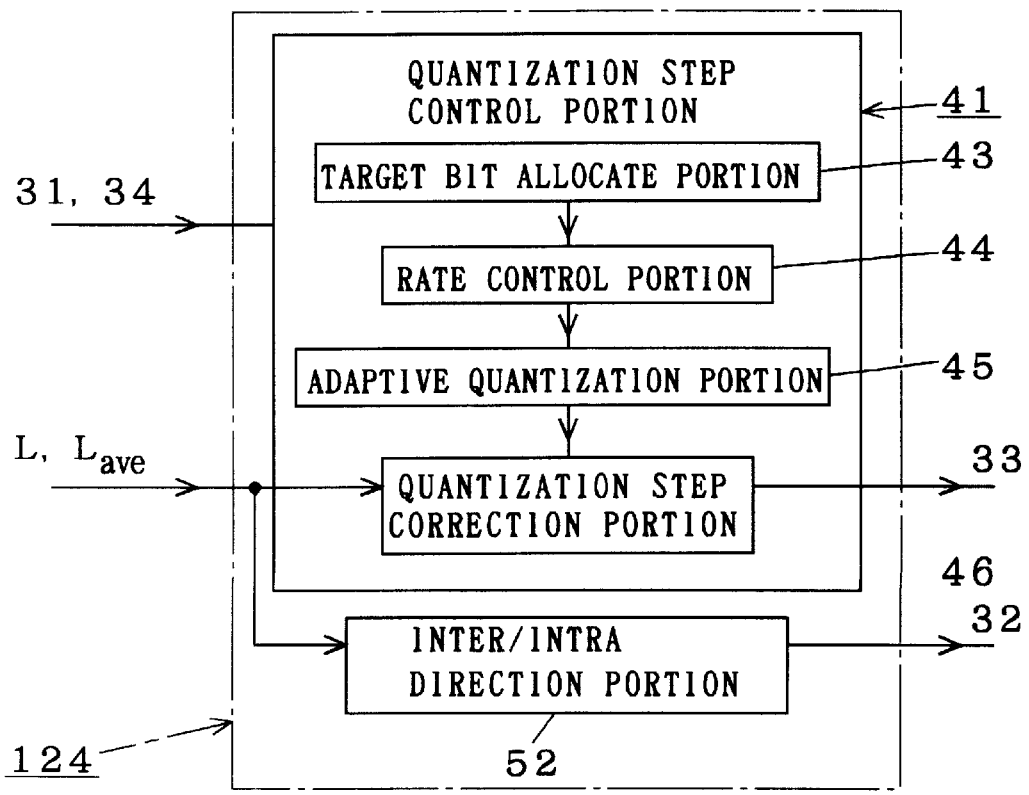
FIG. 19 is a block diagram of the control portion of a fourth preferred embodiment.

As shown in FIG. 19, the control portion 124 includes the inter/intra direction portion 52, like the device of the third preferred embodiment. At the same time, the quantization step control portion 41 includes the quantization step correction portion 46 like the device 101 of the first preferred embodiment. The quantity of motion L and the average quantity of motion $L_{ave}$ are inputted to both of the quantization step correction portion 46 and the inter/intra direction portion 52.

Figure 20:
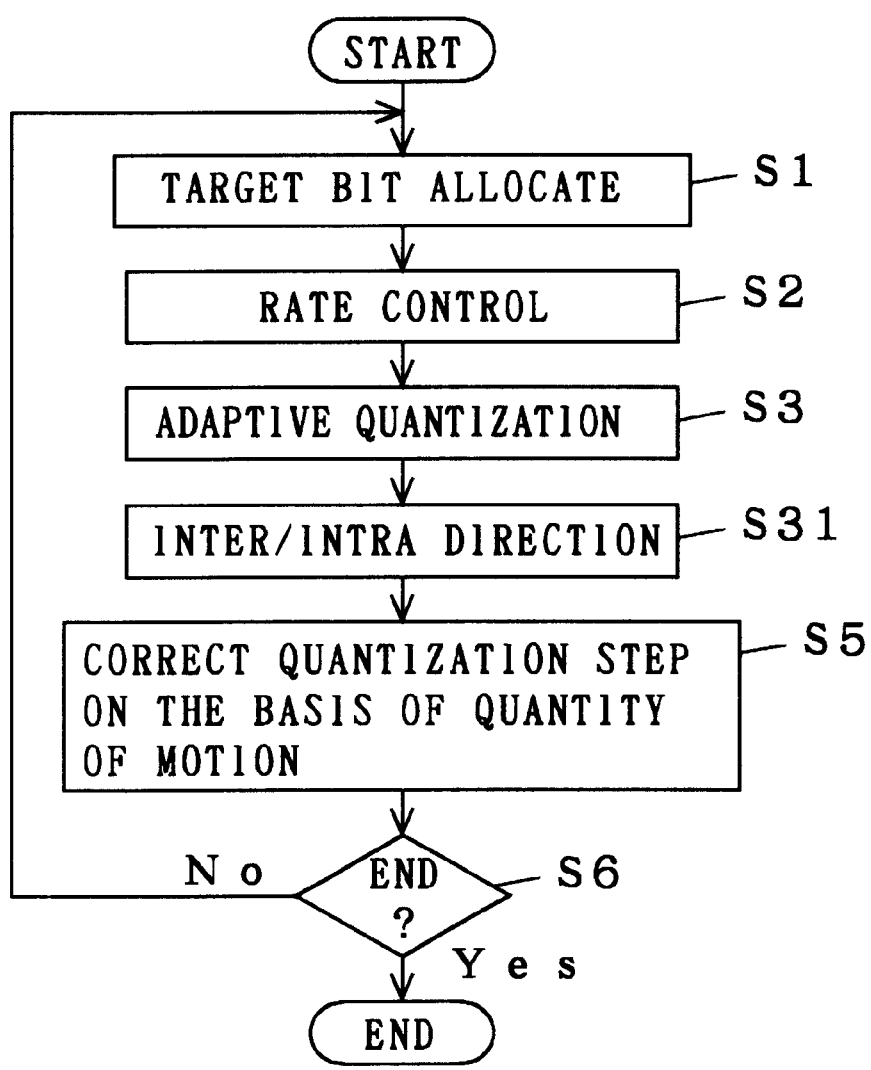
FIG. 20 is a flow chart showing the operation of the control portion of the fourth preferred embodiment.

FIG. 20 is a flow chart showing operating procedure of the control portion 124. The processing in each step is repeatedly applied to each macro block, like shown in FIG. 2. When the processing is started, the processing in Steps S1 to S3 is first executed like the processing of the control portion 91 (Steps S1 to S3 in FIG. 48.) As a result, the value of the quantization step is temporarily determined.

Subsequently, in Step S31, the processing of directing inter/intra is executed. This processing is executed by the inter/intra direction portion 52. That is to say, the selection signal 32 is outputted on the basis of the quantity of motion L according to any of the procedures of FIG. 16 to FIG. 18.

Next, in Step S5, according to the procedure of any of FIG. 5, FIG. 7, and FIG. 8, for example, the value of the quantization step as a temporary value is corrected on the basis of the quantity of motion L. This processing is performed by the quantization step correction portion 46.

Next, the processing moves to Step S6. If it is determined that the processing should be terminated, the processing terminates. If it is determined that the processing should not be terminated, the processing returns to Step S1 and the processing in and after Step S1 is applied to the next macro block.

Since the device of this preferred embodiment thus performs both of the correction of quantization step and the inter/intra direction on the basis of the quantity of motion L, deterioration of visual picture quality which depends on the quantity of motion L is suppressed more effectively.

The operation may be performed in any order between Step S31 and Step S5 in FIG. 20. That is to say, the same effect is obtained whether any of Steps S31 and S5 is carried out first, or both are performed at the same time.

<5. Fifth Preferred Embodiment>

The first to fourth preferred embodiments have shown examples in which macro blocks are classified on the basis of the quantity of motion L using a reference value or reference values relative to the average quantity of motion $L_{ave}$, as shown in FIG. 5 or FIG. 16, for example. However, it is possible to simplify the structure of the device by using a fixed value as the reference value without considering the average quantity of motion $L_{ave}$. This preferred embodiment will explain such a device.

<5-1. First Example>

Figure 21:
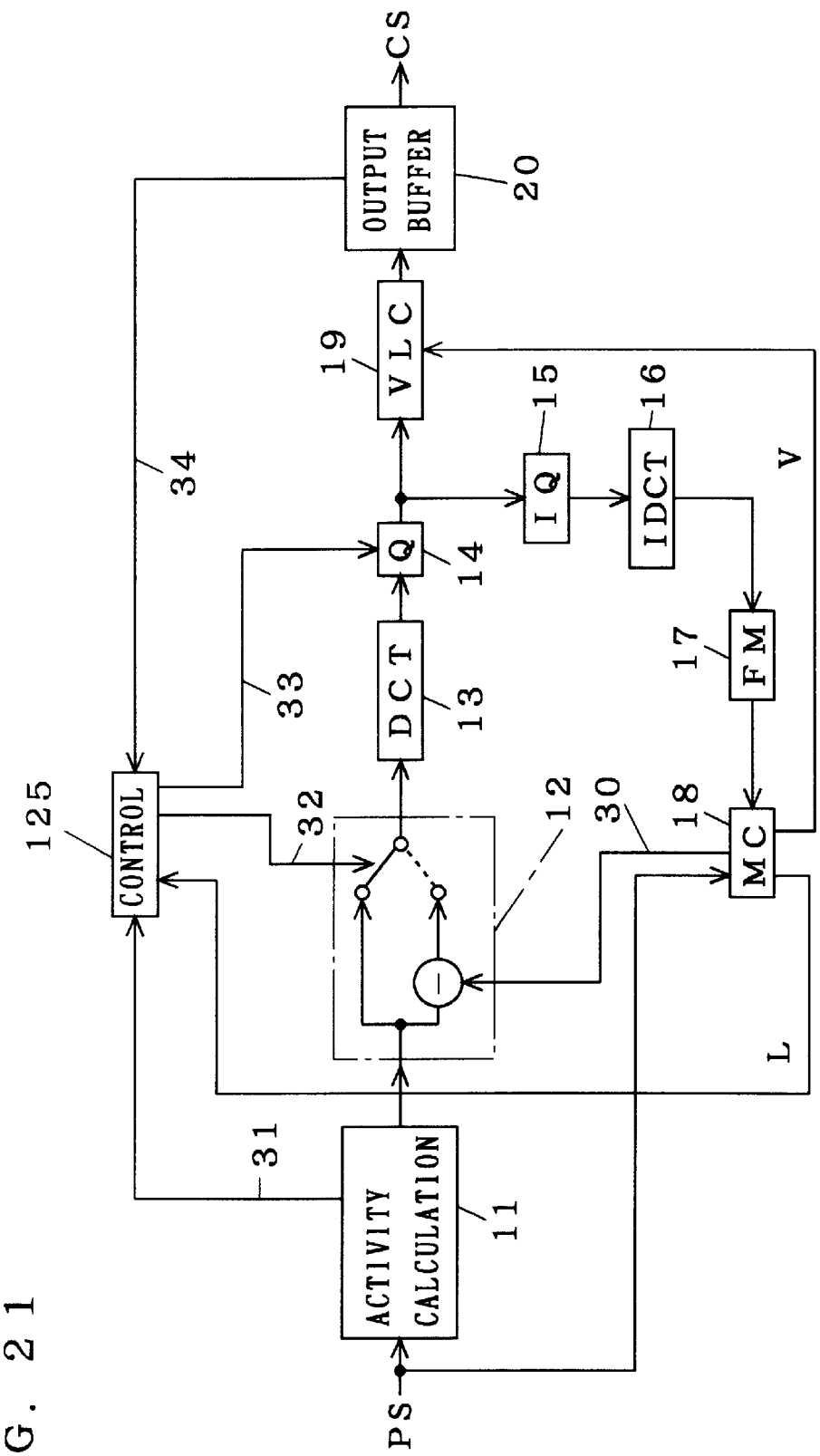
FIG. 21 is a block diagram of a device of a fifth preferred embodiment.

FIG. 21 is a block diagram showing the structure of a picture coding device of a first example. This device 103 is characteristically different from the device 102 (FIG. 12) in that it does not include the addition portion 22 and the division portion 23 and that the control portion 123 is replaced by a control portion 125.

Figure 22:
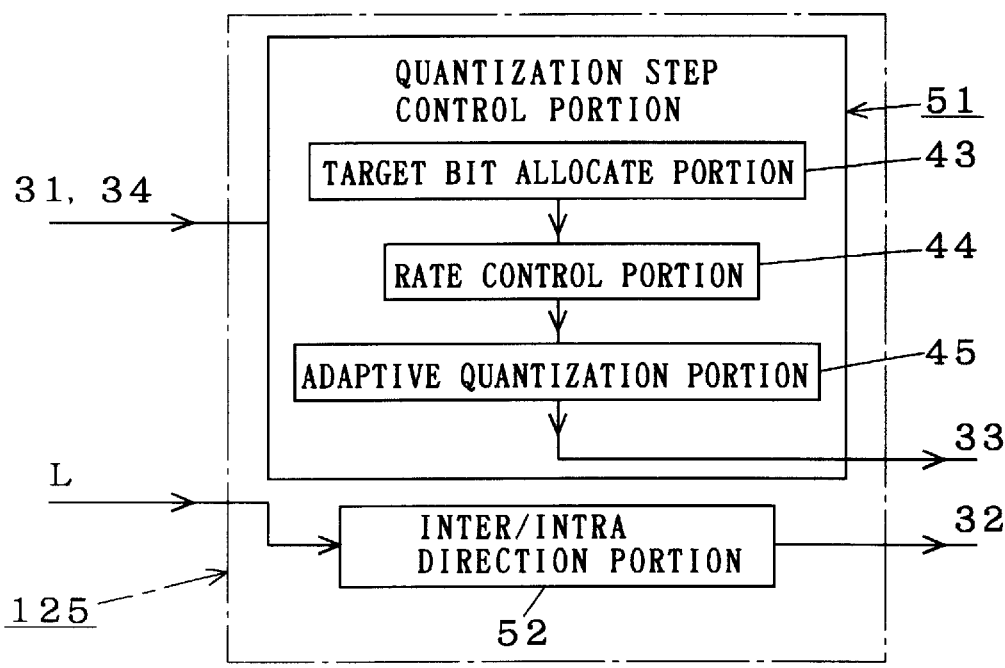
FIG. 22 is a block diagram of the control portion of the fifth preferred embodiment.

FIG. 22 is a block diagram showing the internal structure of the control portion 125. The control portion 125 is characteristically different from the control portion 123 (FIG. 13) in that the quantity of motion L only is inputted to the inter/intra direction portion 52 and the average quantity of motion $L_{ave}$ is not inputted thereto. The internal structure of the inter/intra direction portion 52 is represented in the same way as FIG. 15.

The flow chart showing the operating procedure of the control portion 125 is expressed in the same way as FIG. 14. The internal flow of Step S31 is expressed in the flow chart of FIG. 23 in place of that of FIG. 16. The processing of FIG. 23 is executed by the inter/intra direction portion 52 (FIG. 22.)

Figure 23:
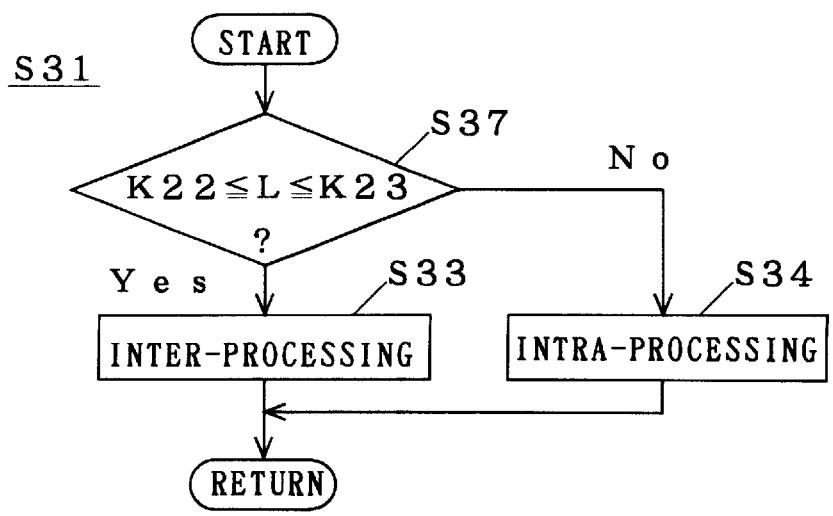
FIG. 23 is a flow chart showing the operation of the inter/intra direction portion of FIG. 22.

As shown in FIG. 23, when the processing of Step S31 is started, first, in Step S37, the quantity of motion L is compared with two kinds of reference values. These reference values are provided by a certain constant K23 and a certain constant K22 smaller than that. The processing in Step S37 is in contrast to Step S32 of FIG. 16 in that the average quantity of motion $L_{ave}$ is not considered and the constants are used as reference values.

If the quantity of motion L is in the range between these reference values, the processing moves to Step S33 and if it is out of the range, it moves to Step S34. The processing in Step S37 is accomplished by the comparison portion 53 (FIG. 15.)

In Step S33, a signal directive of the inter-coding is outputted as the selection signal 32 and a signal directive of the intra-coding is outputted in Step S34. When the processing in Steps S33 and S34 is finished, the entire processing in Step S31 is finished. The processes of Steps S33 and S34 are both executed by the output portion 54 (FIG. 15.)

This way, the device 103 is the same as the device 102 in that the inter-coding is performed to macro blocks with the quantity of motion L corresponding to intermediate values in a certain range defined by two reference values and the intra-coding to other macro blocks. Hence, like the device 102, deterioration of picture quality is suppressed low in part of picture where motion is slow and deterioration of visual picture quality is noticeable, improving the visual picture quality. At the same time, simple processing is selected for part of picture where motion of picture is so slow that the picture quality is not deteriorated so much due to characteristic of the device.

Furthermore, since the average quantity of motion $L_{ave}$ is not considered in the reference values, the structure of the device is simplified, though the accuracy in classifying macro blocks is lower than the device 102. That is to say, the cost required to manufacture the device is reduced. Although FIG. 23 shows an example in which the quantities of motion L are classified on the basis of two reference values, a commensurate effect is obtained when the classification is made by using only one of the two reference values shown in FIG. 23, like the configuration of FIG. 17 or FIG. 18 is possible for FIG. 16.

<5-2. Second Example>

Figure 24:
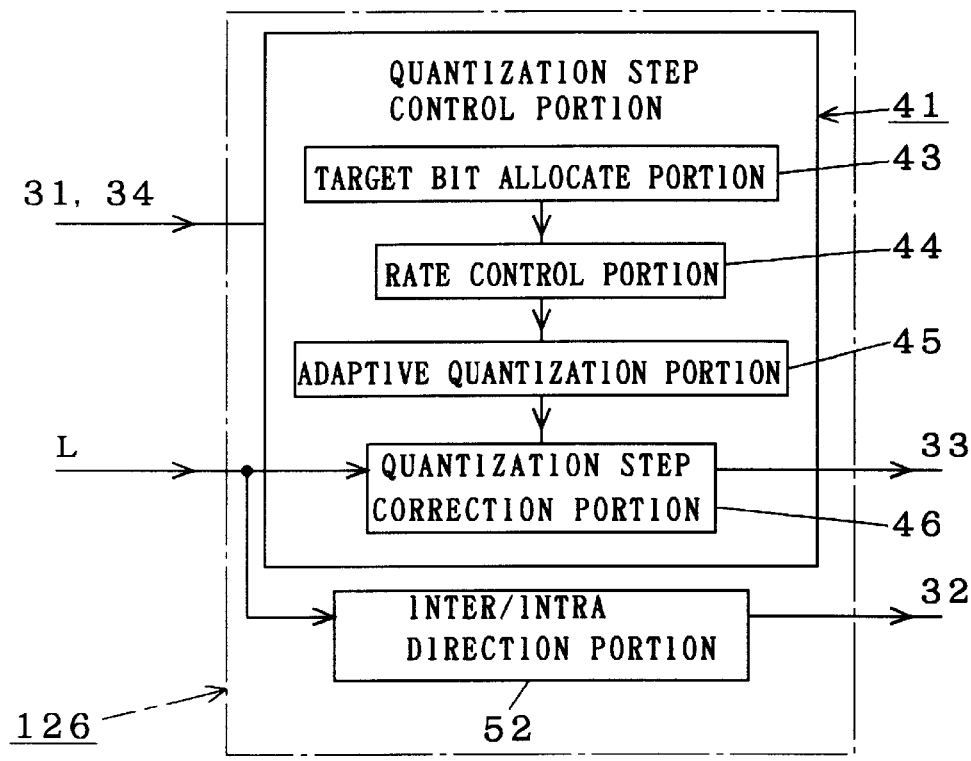
FIG. 24 is a block diagram showing another example of the control portion of the fifth preferred embodiment.

The entire structure of a picture coding device of a second example is expressed in the same way as the block diagram of FIG. 21 except that the control portion 125 is replaced by a control portion 126 having the internal structure shown in FIG. 24.

As shown in FIG. 24, the control portion 126 of this device includes the inter/intra direction portion 52 like the control portion 125 of the first example. At the same time, the quantization step control portion 41 includes the quantization step correction portion 46, similarly to the device 101 of the first preferred embodiment. The quantization step correction portion 46 and the inter/intra direction portion 52 are both supplied with the quantity of motion L.

Figure 25:
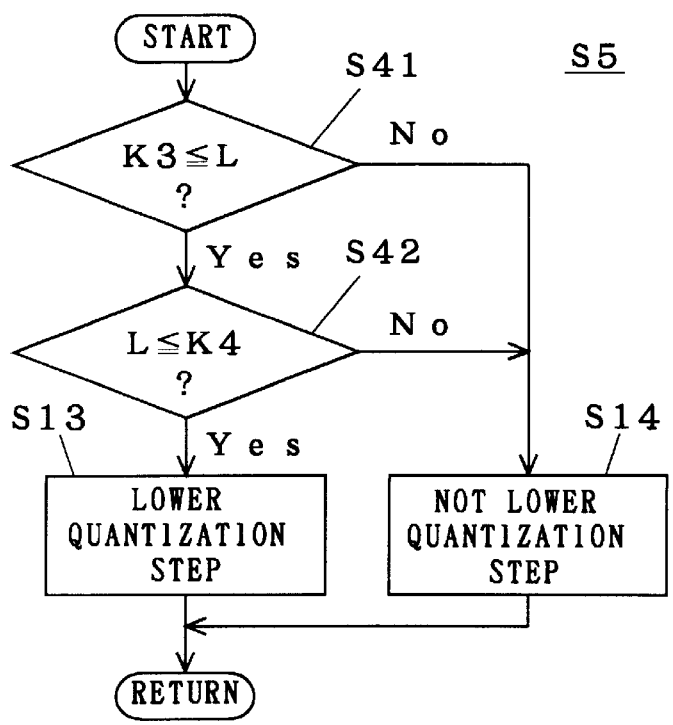
FIG. 25 is a flow chart showing the operation of the control portion of FIG. 24.

The flow chart showing operating procedure of the control portion 126 is expressed the same as FIG. 20. The internal flow of Step S31 is expressed in the flow chart of FIG. 23 and the internal flow of Step S5 is expressed in the flow chart of FIG. 25, instead of FIG. 5. The processing of FIG. 25 is executed by the quantization step correction portion 46 (FIG. 24.) The internal structure of the quantization step correction portion 46 is expressed the same as the block diagram of FIG. 4 except that the average quantity of motion $L_{ave}$ is not inputted thereto.

As shown in FIG. 25, when the processing of Step S5 is started, first, in Step S41, the quantity of motion L is compared with a reference value. This reference value is provided by a certain constant K3. If the quantity of motion L is equal to or lager than the reference value, the processing moves to Step S42 and if it is smaller than the reference value, it moves to Step S14.

In Step S42, the quantity of motion L is compared with another reference value. This reference value is provided by a certain constant K4. This reference value is set to a value larger than the reference value in Step S41. That is to say, the two constants K3 and K4 are set so that constant K3<constant K4.

In Step S42, if it is determined that the quantity of motion L is equal to or smaller than the reference value, the processing moves to Step S13 and if it is larger than the reference value, it moves to Step S14. This processing is executed in the comparison portion 47 (FIG. 4.) The processes in Step S41 and Step S42 are in contrast to those in Step S11 and Step S12 of FIG. 5 in that the average quantity of motion $L_{ave}$ is not considered and the constants are used as reference values. The following processings in Steps S13 and S14 are respectively the same as the processes shown at the same reference characters in FIG. 5, which are executed by the operation portion 48 (FIG. 4.)

In the device of the second example, since both of the correction of the quantization step and the inter/intra direction are performed on the basis of the quantity of motion L, deterioration of visual picture quality dependent on the quantity of motion L is more effectively suppressed. Furthermore, since the average quantity of motion $L_{ave}$ is not considered in the reference values, the structure of the device can be simplified, though the accuracy of classification of macro blocks is lower than the device of the fourth preferred embodiment. That is to say, the cost required to manufacture the device is reduced.

Although FIG. 25 shows an example in which the quantities of motion L are classified on the basis of two reference values, the classification may be accomplished by using only one of the two reference values shown in FIG. 25 to provide a commensurate effect, just like the configurations of FIG. 7 and FIG. 8 for FIG. 5.

<6. Sixth Preferred Embodiment>

Figure 26:
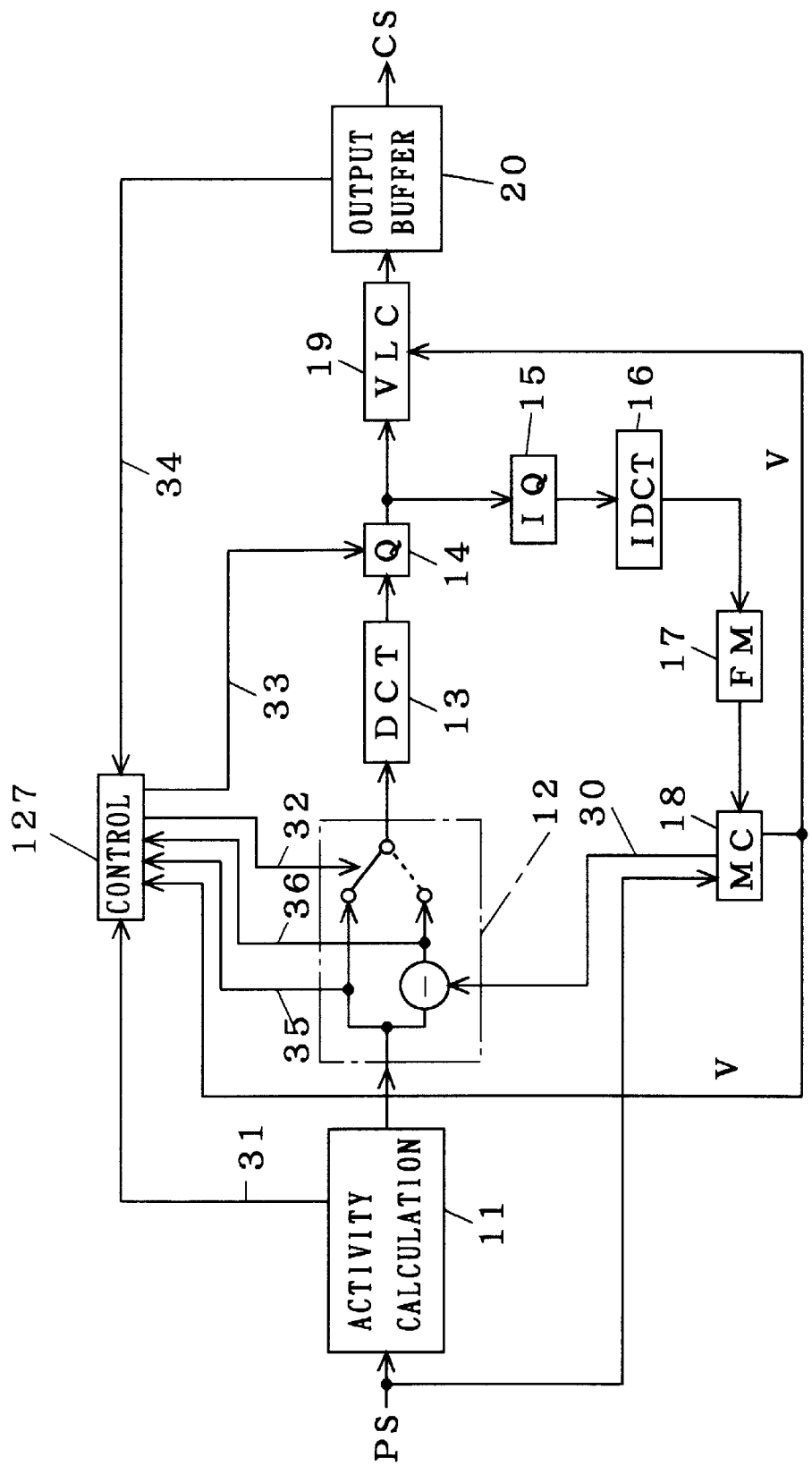
FIG. 26 is a block diagram of a device according to a sixth preferred embodiment.

FIG. 26 is a block diagram showing the structure of a picture coding device according to a sixth preferred embodiment. This device 104 characteristically differs from the device 101 (FIG. 1) in that it does not include the addition portion 22 and the division portion 23, the motion vector V is inputted instead of the quantity of motion L to the control portion from the motion compensation portion 18 and that the control portion 121 is replaced by the control portion 127. In the device 104, the motion compensation portion 18 only calculates the motion vector V and it does not calculate the absolute value thereof, or the quantity of motion L.

Figure 27:
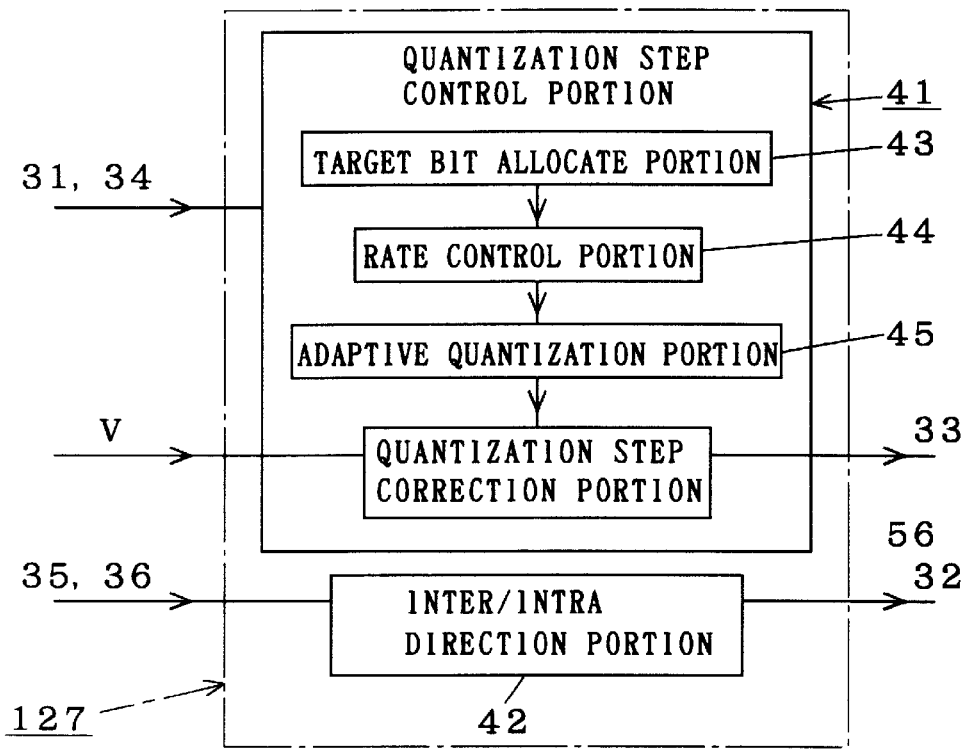
FIG. 27 is a block diagram of the control portion of the sixth preferred embodiment.

FIG. 27 is a block diagram showing the internal structure of the control portion 127. The control portion 127 characteristically differs from the control portion 121 of the device 101 in that it includes a quantization step correction portion 56 in place of the quantization step correction portion 46.

In the quantization step correction portion 56, the value of the quantization step temporarily set in the adaptive quantization portion 45 is corrected on the basis of the value of the quantization step of a predictive picture. The motion vector V sent from the motion compensation portion 18 is referred to to search for a predictive picture corresponding to an object macro block. Then the quantization step direction signal 33 corresponding to the corrected quantization step is sent to the quantization portion 14.

Figure 28:
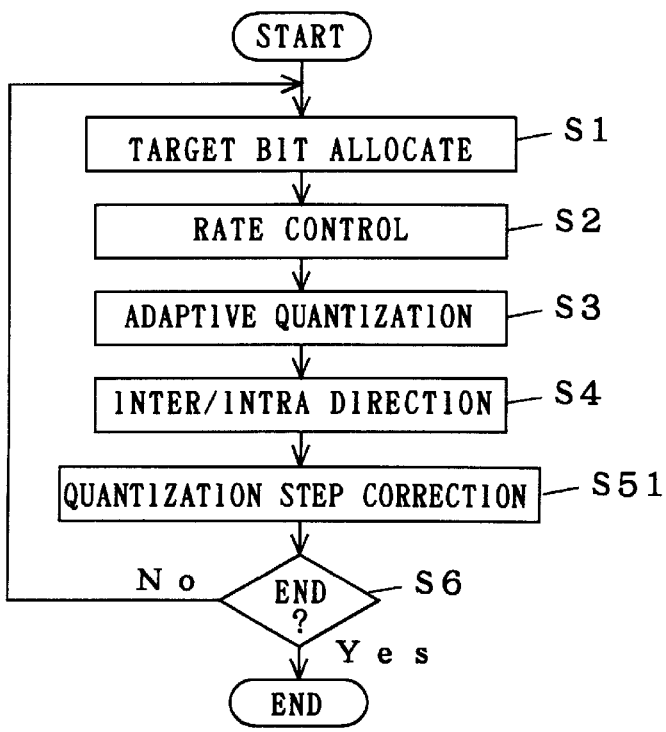
FIG. 28 is a flow chart showing the operation of the control portion of the sixth preferred embodiment.

FIG. 28 is a flow chart showing the flow of operation of the control portion 127. The control portion 127 repeatedly executes the processing in each step for each macro block. When the processing is started, first, the processing in Step S1 to S4 is executed like the processing by the control portion 91 (Steps S1 to S4 in FIG. 48.) As a result, operation of the switch portion of the switching portion 12 is determined and a value of the quantization step is determined as a temporary value.

Subsequently, in Step S51, the value of the quantization step as a temporary value is corrected on the basis of the magnitude of the quantization step of the predictive picture. That is to say, the correction coefficient temporarily determined in Step S3 is modified. This processing is executed by the quantization step correction portion 56.

Next, the processing moves to Step S6 and if it is determined that the processing should be terminated, it terminates. When it is determined that the processing should not be terminated, the processing returns to Step S1 and the processing in and after Step S1 is executed to the next macro block. Thus the processing is applied to all macro blocks one after another.

Figure 29:
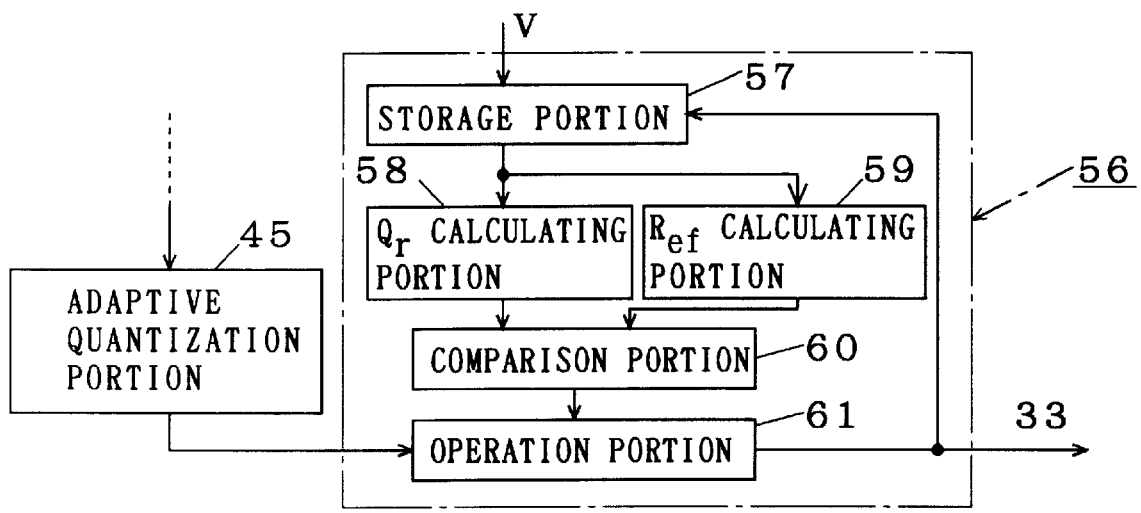
FIG. 29 is a block diagram of the quantization step correction portion of FIG. 27.
Figure 30:
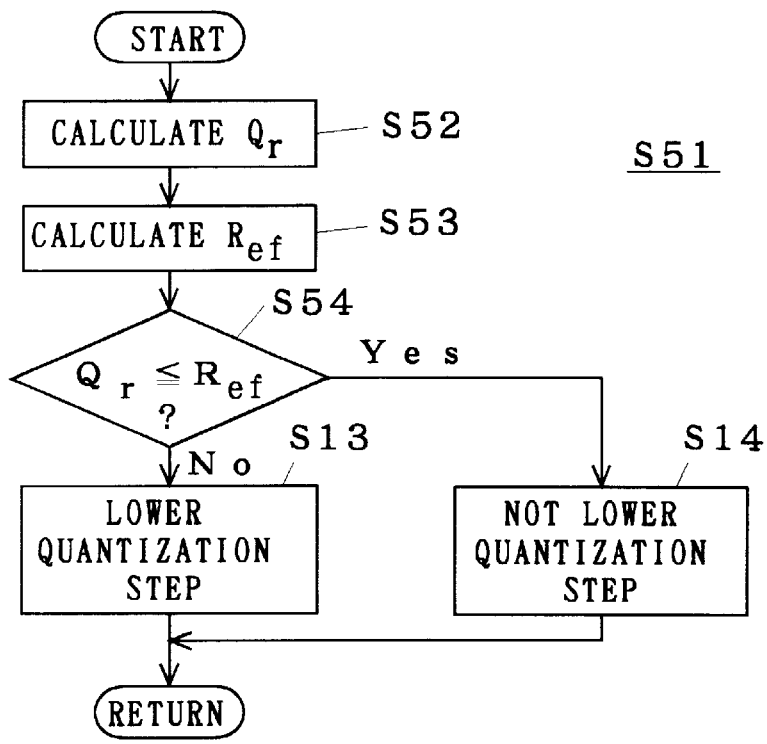
FIG. 30 is a diagram showing the internal flow of Step S51 in FIG. 28.

FIG. 29 is a block diagram showing the internal structure of the quantization step correction portion 56. The quantization step correction portion 56 includes a storage portion 57, a portion for calculating quantization step ($Q_r$) of predictive picture, 58, a reference value ($R_{re}$) calculating portion 59, a comparison portion 60 and an operation portion 61. The flow of operation of the quantization step correction portion 56 having these components, or the internal flow of Step S51 shown in FIG. 28 is shown in the flow chart of FIG. 30. When the processing of Step S51 is started, first, in Step S52, the quantization step $Q_r$ of a predictive picture is calculated. This processing is executed by the $Q_r$ calculating portion 58.

Figure 31:
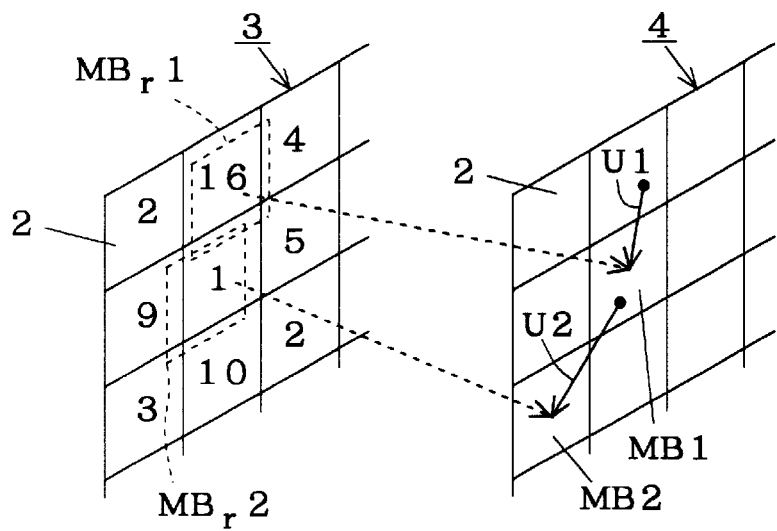
FIG. 31 to FIG. 33 are diagrams for illustrating operation of the device of the sixth preferred embodiment.

The storage portion 57 stores a quantization step direction signal 33 corresponding to a quantization step for each macro block, which has been finally calculated for the picture signal PS one frame before the present processed object (that is, the present reference picture) by the operation portion 61. That is to say, as shown in the explanation diagram of FIG. 31, quantization steps (the values in the frames of FIG. 31) have been already determined for each macro block 2 which forms the reference picture 3 and the values are stored in the storage portion 57 in the form of quantization step direction signals 33.

Then, in the $Q_r$ calculating portion 58, a predictive picture corresponding to the present object macro block in the picture signal PS (the picture 4 in FIG. 31) is identified on the basis of the motion vector V. For the macro block MB1, for example, the predictive picture $MB_r1$ is identified on the basis of the motion vector U1, and for the macro block MB2, the predictive picture $MB_r2$ is identified on the basis of the motion vector U2.

Figure 32:
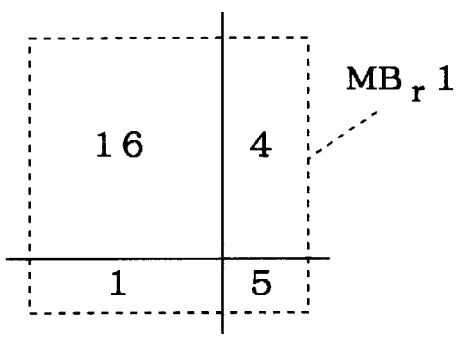
Figure 33:
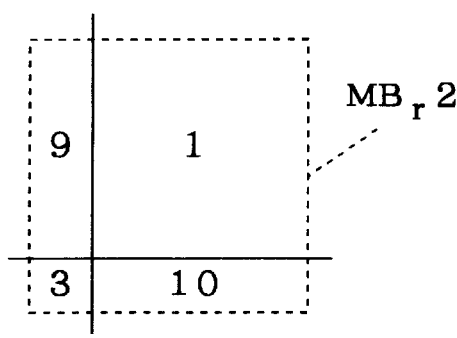

FIG. 32 and FIG. 33 illustrate the relation between macro blocks in the reference picture 3 and the predictive pictures $MB_r1$ and $MB_r2$, respectively. As illustrated in these diagrams, the predictive picture does not necessarily correspond to a macro block in the reference picture 3 but it generally lies over a plurality of macro blocks. The $Q_r$ calculating portion 58 calculates the value of a quantization step $Q_r$ of a predictive picture as an average value based on areas of individual macro blocks appearing in the predictive picture, for example.

For example, the value of the quantization step $Q_r$ of the predictive picture $MB_r1$ illustrated in FIG. 32 is calculated as about "10" as an average weighted with the areas of "16", "4", "1" and "5." The value of the quantization step $Q_r$ of the predictive picture $MB_r2$ illustrated in FIG. 33 is calculated as about "3.8" as the average weighted with the areas of "9", "1", "3" and "10."

When the processing in Step S52 is ended, the process moves to Step S53 and the value of the reference value $R_{re}$ referred to in the following Step S54 is calculated. This processing is executed by the $R_{re}$ calculating portion 59.

The reference value $R_{re}$ is, for example, set as an average value of quantization steps in the entire reference picture 3, or as a value relative to this average value (e.g., the sum or the product of the average value and a fixed value) by referring to the quantization step direction signals 33 stored in the storage portion 57. When a common value is used for all macro blocks in one picture signal PS as the reference value $R_{re}$, like these examples, it is sufficient to execute Step S53 only when processing of the first macro block is performed in processing of one picture signal PS.

As another example of the reference value $R_{re}$, an average value of quantization steps in the vicinity of the predictive picture corresponding to the present object macro block, or a value relative to this average value may be calculated as the reference value $R_{re}$. For example, in FIG. 31, when the macro block MB1 is currently an object of processing, then the reference value $R_{re}$ can be determined by using an average value of quantization steps of a plurality of macro blocks located in the vicinity of the predictive picture $MB_r1$. The range of the "vicinity" can be arbitrarily set.

Or, most simply, a certain constant may be provided as the reference value $R_{re}$. In this case, it is not necessary to specially provide the $R_{re}$ calculating portion 59.

Next, in Step S54, the quantization step $Q_r$ and the reference value $R_{re}$ are compared in magnitude. This processing is executed by the comparison portion 60. If the quantization step $Q_r$ is equal to or smaller than the reference value $R_{re}$, the processing moves to Step S14 and if it is larger than the reference value $R_{re}$, it moves to Step S13.

The processings in steps S13 and S14 are the same as those shown at the same characters in FIG. 5, which are executed by the operation portion 61. That is to say, in Step S13, the value of the quantization step temporarily determined in the adaptive quantization portion 45 is downwardly corrected and a corresponding quantization step direction signal 33 is outputted. On the other hand, in Step S14, it is not downwardly corrected and the quantization step indication sinal 33 corresponding to the quantization step as the temporary value is outputted.

The quantization step direction signal 33 outputted from the operation portion 61 is inputted to the quantization portion 14 and also stored in the storage portion 57. The stored quantization step direction signal 33 is referred to by the $Q_r$ calculating portion 58 when processing the next picture signal PS. When the processing in Step S13 or Step S14 is ended, the processing in Step S51 is also ended and it moves to Step S6.

As explained above, in the device 104, the quantization step of a present object macro block is lowered when the quantization step of the predictive picture is larger than the reference value. Hence, even if the quantization step of the predictive picture is large and the quantization error is large, it is possible to prevent the large quantization error from being transmitted to the coded signal CS. That is to say, this prevents deterioration of picture quality caused by coding from being unnecessarily transmitted to the following pictures, resulting in improvement of picture quality.

<7. Seventh Preferred Embodiment>

Figure 34:
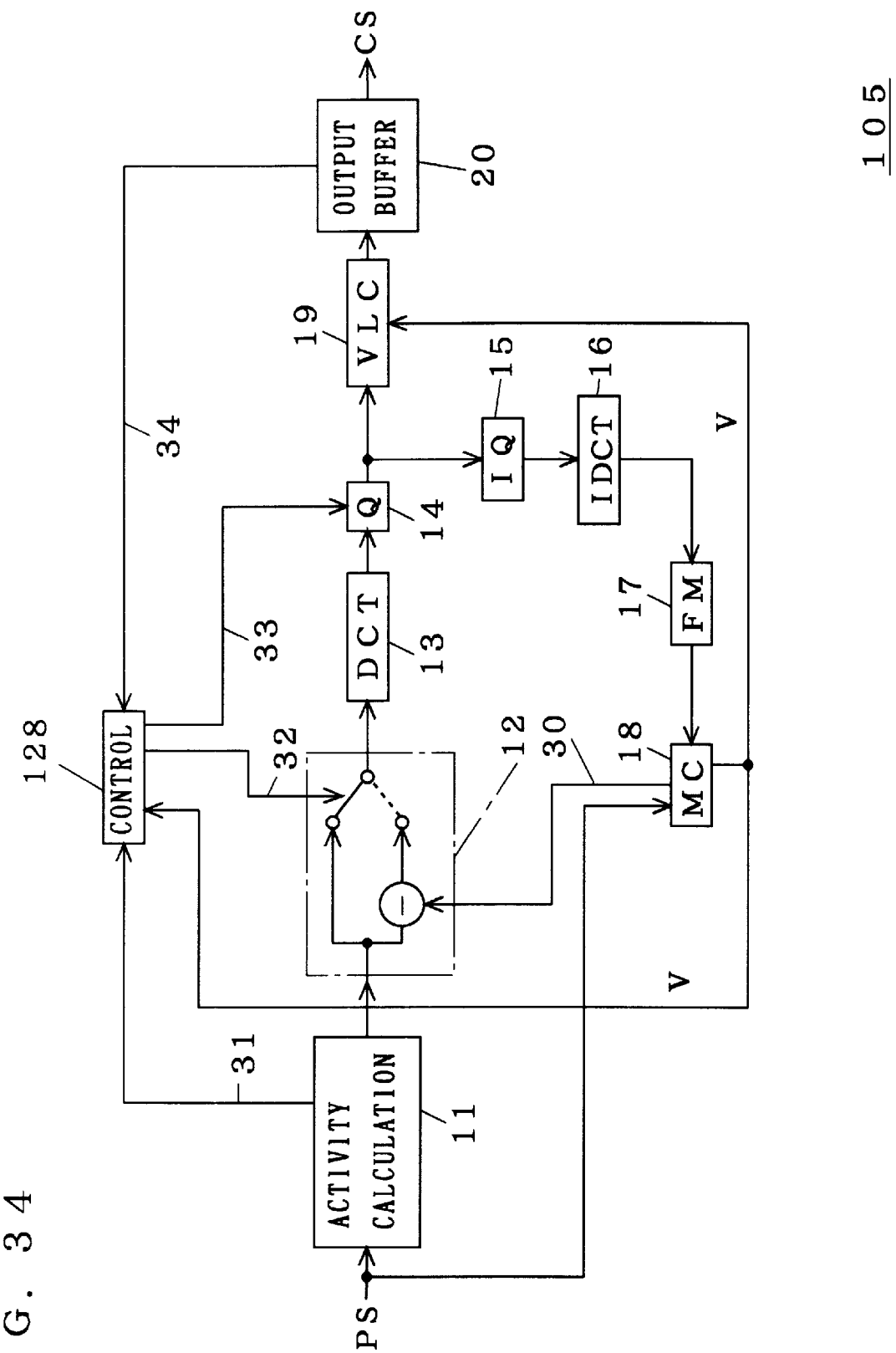
FIG. 34 is a block diagram of a device of a seventh preferred embodiment.

FIG. 34 is a block diagram showing the structure of a picture coding device according to a seventh preferred embodiment. Unlike the device 104, in this device 105, the control portion 128 outputs the selection signal 32 to the switching portion 12 without referring to any of the non-differential picture 35 and the differential picture 36.

Figure 35:
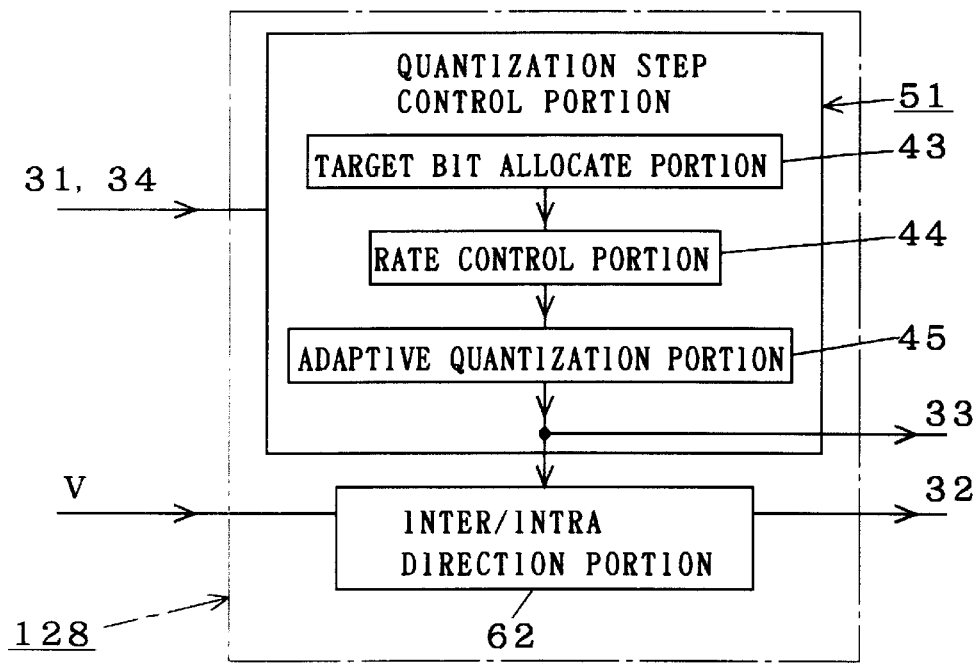
FIG. 35 is a block diagram of the control portion of the seventh preferred embodiment.

FIG. 35 is a block diagram showing the internal structure of the control portion 128. As shown in FIG. 35, the quantization step control portion 51 of the control portion 128 is constructed the same as the corresponding part of the conventional device 151. The inter/intra direction portion 62 of the control portion 128 is supplied with the motion vector V, unlike the inter/intra direction portion 42 of FIG. 27.

Figure 36:
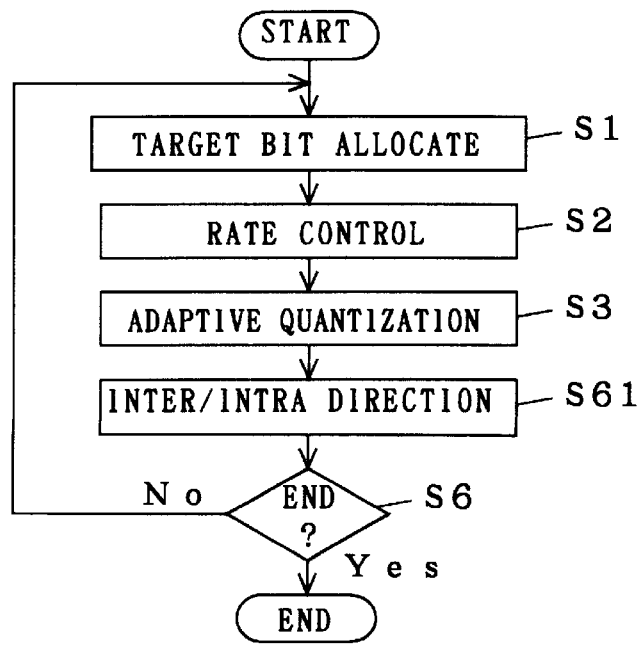
FIG. 36 is a flow chart showing the operation of the control portion of the seventh preferred embodiment.

FIG. 36 is a flow chart showing the flow of operation of the control portion 128. The control portion 128 repeatedly executes process of each step for each macro block. When the processing is started, first, the processing in Steps S1 to S3 is executed similarly to the processing of the control portion 91 (Steps S1 to S3 in FIG. 48.) As a result, the value of the quantization step is determined. The quantization step is settled in this step.

Subsequently, in Step S61, the processing is executed to direct inter/intra. In this processing, it is determined whether to select the inter-coding or the intra-coding on the basis of magnitude of the quantization step of a predictive picture and a selection signal 32 corresponding to the determination is sent to the switching portion 12. This processing is accomplished by the inter/intra direction portion 62.

Next, the processing moves to Step S6 and if it is determined that the processing should be terminated, then the processing is terminated. If it is determined that the processing should not be terminated, the processing returns to Step S1 and the processing in and after Step S1 is applied to the next macro block. The processing is thus applied to all macro blocks one after another.

Figure 37:
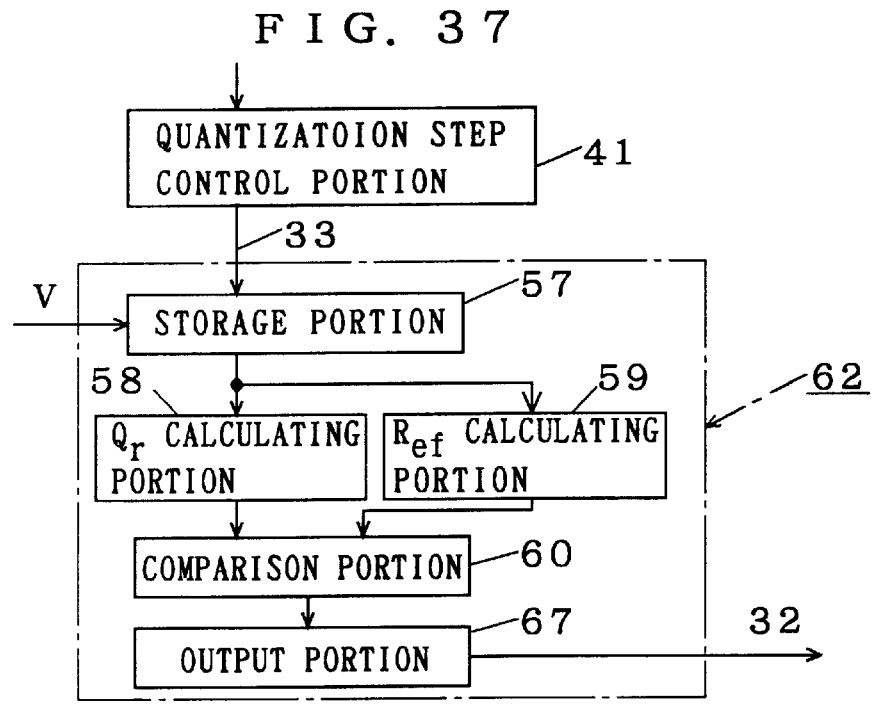
FIG. 37 is a block diagram of the inter/intra direction portion of FIG. 35.
Figure 38:
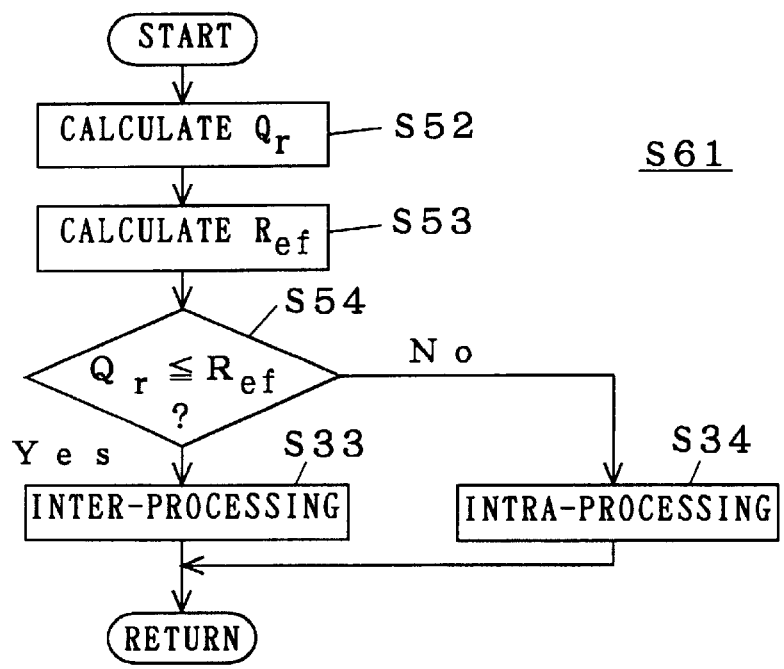
FIG. 38 is a diagram showing the internal flow of Step S61 in FIG. 36.

FIG. 37 is a block diagram showing the internal structure of the inter/intra direction portion 62. The inter/intra direction portion 62 includes a storage portion 57, a portion for calculating quantization step ($Q_r$) of predictive picture, 58, a reference value ($R_{re}$) calculating portion 59, a comparison portion 60 and an output portion 67. The flow of operation of the inter/intra direction portion 62 having theses components, in other words, the internal flow of the Step S61 shown in FIG. 36 is shown in the flow chart of FIG. 38.

When the processing of Step S61 is started, first, in Step S52, the quantization step of the predictive picture is calculated. This process is executed by the $Q_r$ calculating portion 58. The storage portion 57 stores the quantization step direction signal 33 corresponding to the quantization step for each macro block, which has been calculated for the picture signal PS one frame before the current processed object (that is, the current reference picture) by the quantization step control portion 41.

In the $Q_r$ calculating portion 58, a predictive picture corresponding to the macro block of the present object in the picture signal PS is identified on the basis of the motion vector V and the quantization step of this predictive picture is calculated on the basis of the quantization step direction signals 33 stored in the storage portion 57. The algorithm of the operation is the same as that of the sixth preferred embodiment.

Next, in Step S53, the value of the reference value $R_{re}$ referred to in the following Step S54 is calculated. This processing is executed by the $R_{re}$ calculating portion 59. The algorithm of calculating the reference value $R_{re}$ is also the same as the sixth preferred embodiment.

Next, in Step S54, the quantization step $Q_r$ and the reference value $R_{re}$ are compared in magnitude. This processing is executed by the comparison portion 60. If the quantization step $Q_r$ is equal to or smaller than the reference value $R_{re}$, the processing moves to Step S33 and if it is larger than the reference value $R_{re}$, it moves to Step S34.

In Step S33, a signal directive of inter-coding is outputted as the selection signal 32 and a signal directive of intra-coding is outputted in Step S34. When the processing in Steps S33 and S34 is finished, then the entire processing of Step S61 is finished. The processes in Steps S33 and S34 are both executed in the output portion 67.

This way, the device 105 applies the intra-coding to macro blocks the quantization step of predictive picture of which is larger than the reference value, and the inter-coding is applied to other macro blocks. Accordingly, even if the quantization step of predictive picture is large and the quantization error is large, it is possible to prevent the large quantization error from being transmitted to the coded signal CS. That is to say, this prevents deterioration of picture quality due to coding from being unnecessarily transmitted to the following pictures, resulting in improvement of picture quality.

<8. Eighth Preferred Embodiment>

Figure 39:
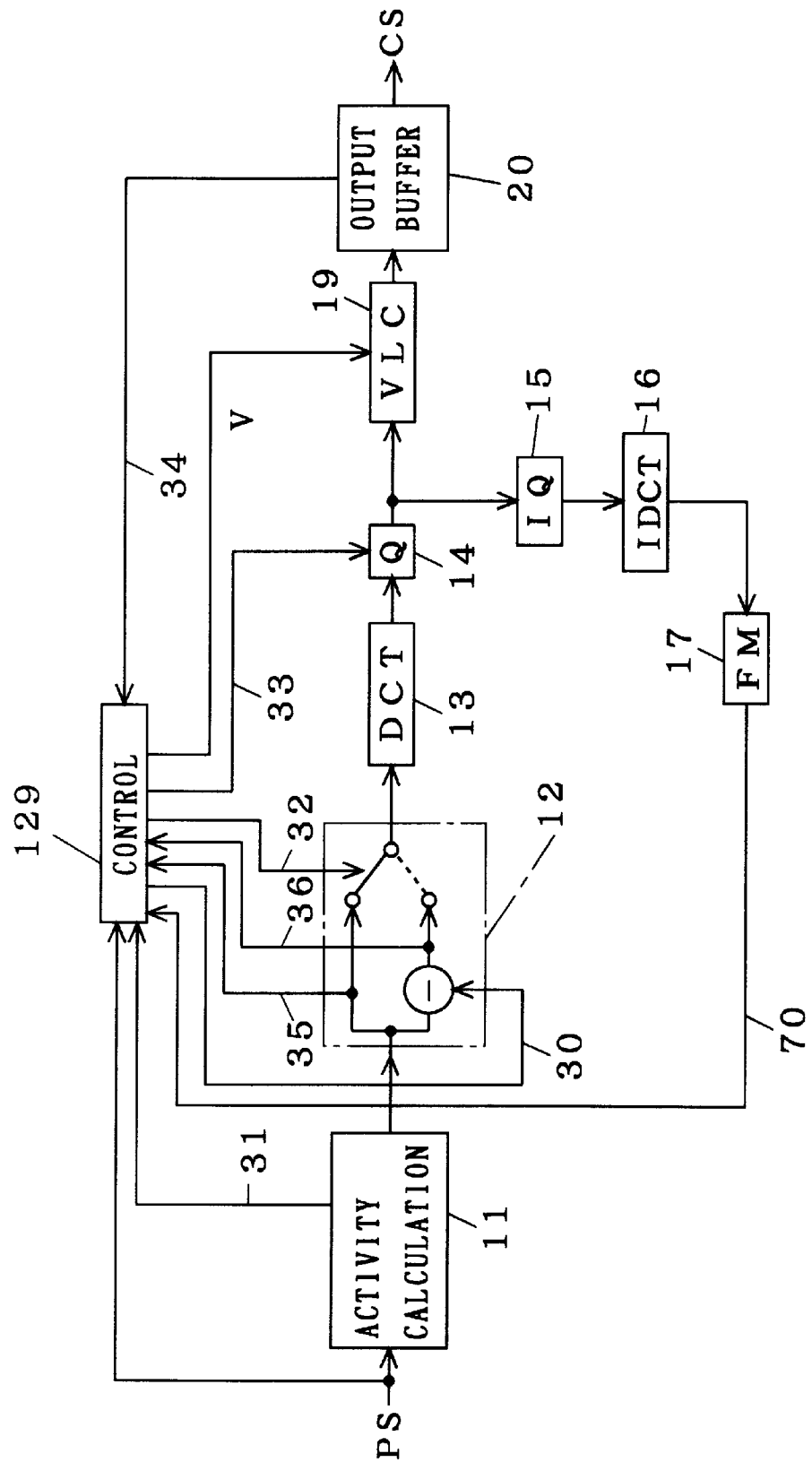
FIG. 39 is a block diagram of a device of an eighth preferred embodiment.

FIG. 39 is a block diagram showing the structure of a picture coding device according to an eighth preferred embodiment. In this device 106, the motion vector V is set on the basis of the quantization step of a predictive picture. Therefore, the motion compensation portion is incorporated in the control portion 129. Accordingly, the control portion 129 is fed with the picture signal PS and the reference picture 70 stored in the frame memory 17 and the control portion 129 sends the predictive picture 30 to the switching portion 12 and the motion vector V to the VLC 19. The entire structure of the device 106 characteristically differs from the conventional device 151 (FIG. 46) in these respects.

Figure 40:
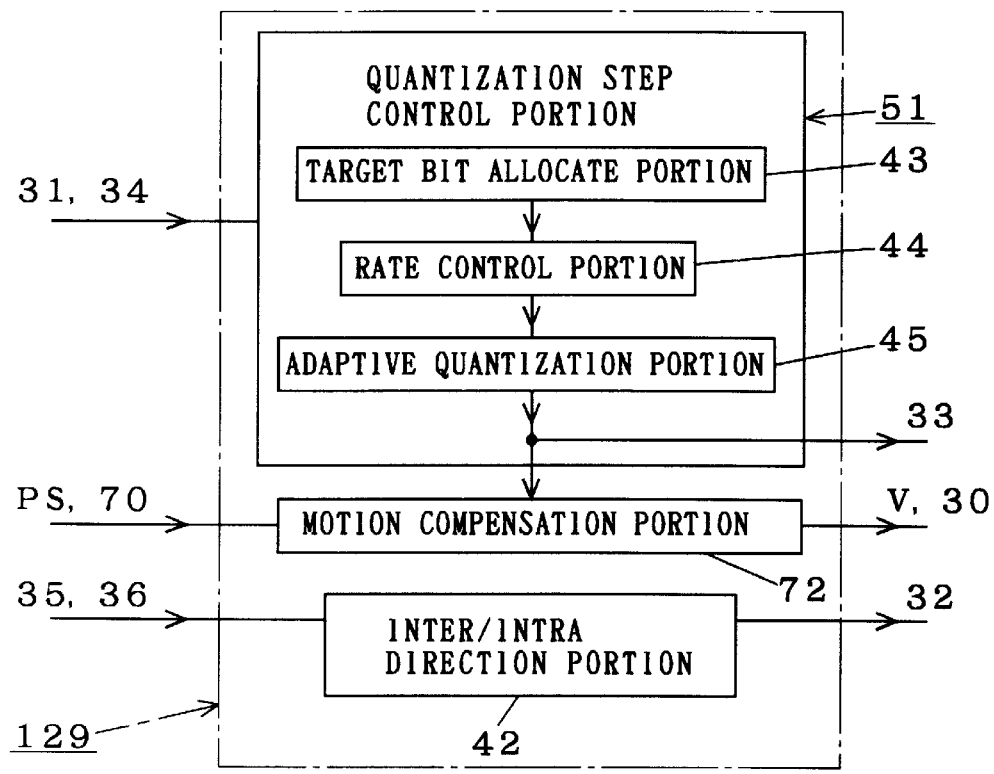
FIG. 40 is a block diagram of the control portion of the eighth preferred embodiment.

FIG. 40 is a block diagram showing the internal structure of the control portion 129. The control portion 129 characteristically differs from the conventional control portion 91 (FIG. 47) in that it includes a motion compensation portion 72 in addition to the quantization step control portion 51 and the inter/intra direction portion 42. The motion compensation portion 72 refers to the picture signal PS, the reference picture 70 and the quantization step direction signal 33 to calculate the motion vector V and outputs the calculated motion vector V and the corresponding predictive picture 30.

Figure 41:
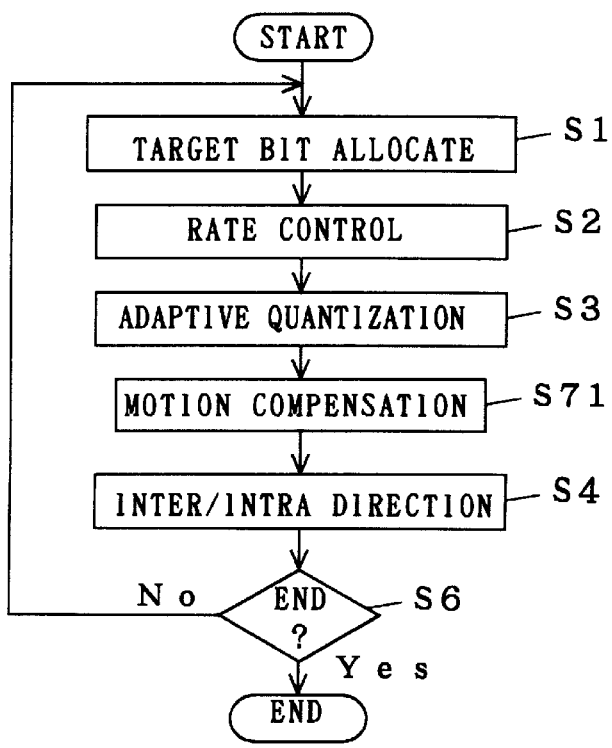
FIG. 41 is a flow chart of the control portion of the eighth preferred embodiment.

FIG. 41 is a flow chart showing the flow of operation of the control portion 129. The control portion 129 repeatedly executes processing in each step for each macro block. When the processing is started, first, the processing in Steps S1 to S4 is executed similarly to the processing by the control portion 91 (Steps S1 to S4 in FIG. 48.) As a result, operation of the switch portion of the switching portion 12 is determined and the value of the quantization step is determined.

After the step S3, in Step S71, motion compensation processing, i.e., the processing by the motion compensation portion 72 is carried out. After the steps S71 and S4, the processing moves to Step S6 and if it is determined that the processing should be terminated, the processing is terminated. If it is determined that the processing should not be terminated, the processing returns to Step S1 and the processing in and after Step S1 is applied to the next macro block. Thus the processing is applied to all macro blocks one after another.

Figure 42:
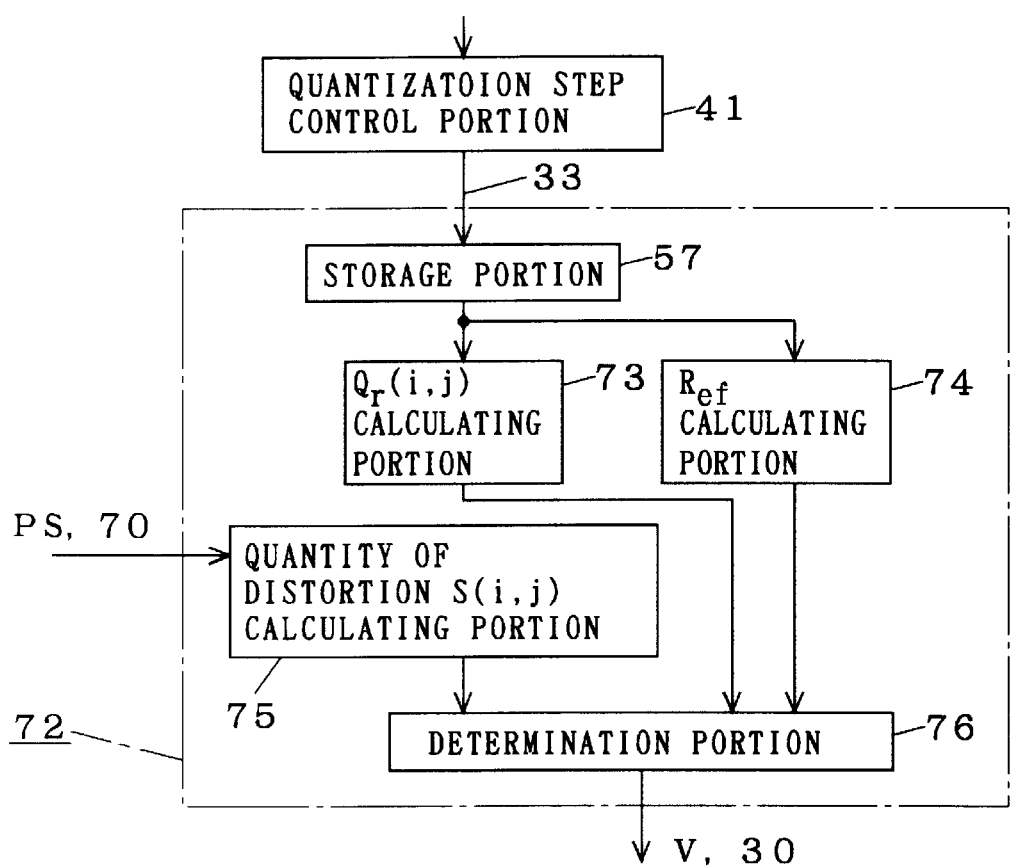
FIG. 42 is a block diagram of the motion compensation portion of FIG. 40.
Figure 43:
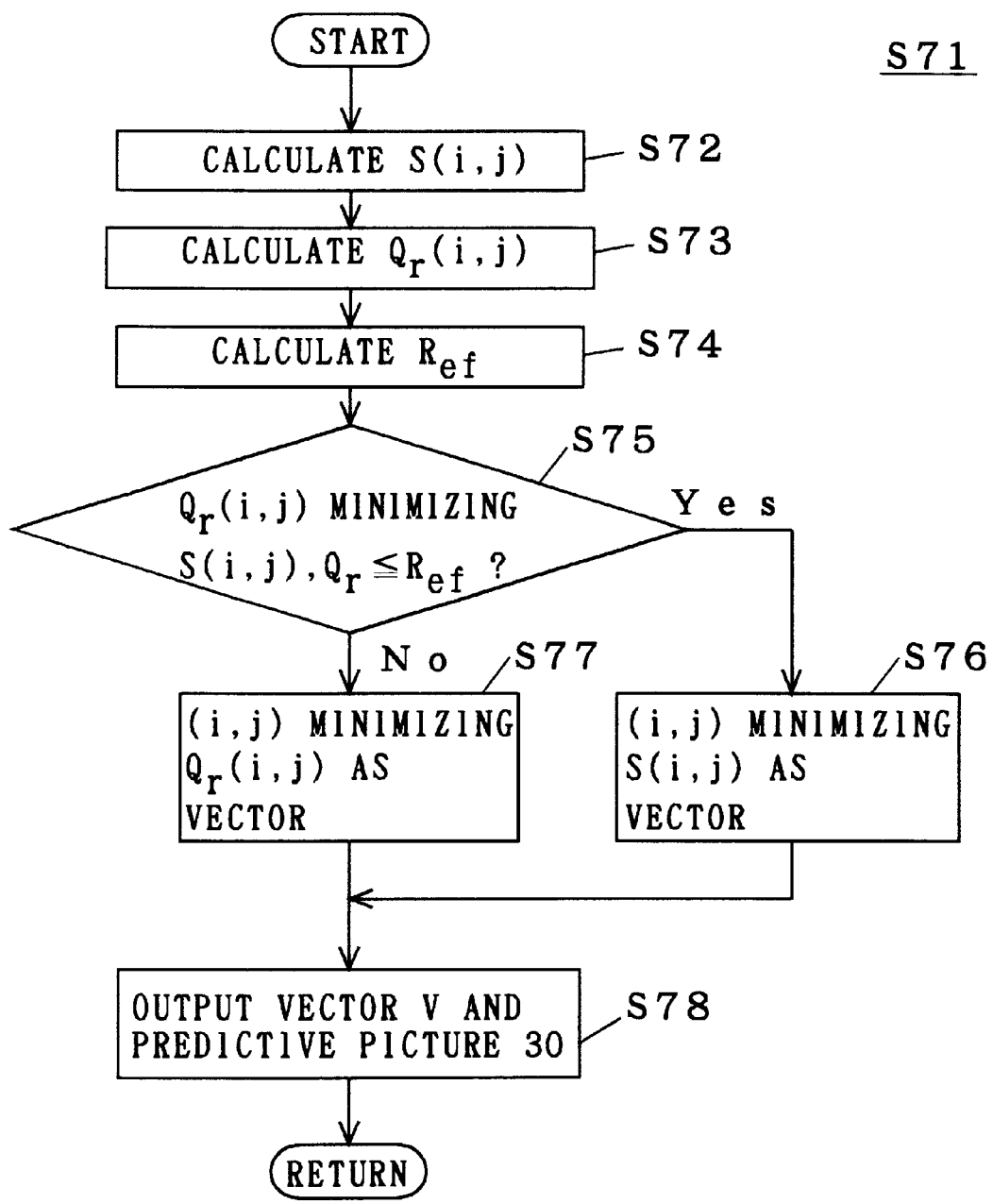
FIG. 43 is a diagram showing the internal flow of Step S71 of FIG. 41.

FIG. 42 is a block diagram showing the internal structure of the motion compensation portion 72. The motion compensation portion 72 includes a storage portion 57, a $Q_r(i,j)$ calculating portion 73, a $R_{re}$ calculating portion 74, a quantity of distortion (Si,j) calculating portion 75 and a determination portion 76. The flow of operation of the motion compensation portion 72 having these elements, that is, the internal flow of Step S71 shown in FIG. 41 is shown in the flow chart of FIG. 43.

When the processing in Step S71 is started, first, in Step S72, the quantity of distortion S(i,j) is calculated. This processing is executed in the S(i,j) calculating portion 75. The quantity of distortion S(i,j) corresponds to magnitude of the gap of pixel values between a processed object macro block in the picture signal PS and a part of picture shifted by pixel position (i,j) from the corresponding macro block in the reference picture 70, which is defined by equation 1 below, for example.

$$S(i, j) = \sum_{p=0}^{N-1}\sum_{q=0}^{N-1} |Xm(Nk + p, Nl + q) - Xm-1(Nk + p + i, Nl + q + j)| \quad (1)$$

In equation 1, the processed object macro block is formed of N×N pixels having the pixel position (Nk, Nl) and the pixel position (Nk+N, Nl+N) as opposite angles. In equation 1, the character "Xm" represents a pixel value in the picture signal PS and the character "Xm-1" represents a pixel value in the reference picture. That is to say, equation 1 defines the gap of pixel values with an absolute-value sum of differences of pixel values.

Instead of defining by equation 1, it is also possible to define the quantity of distortion S(i,j) with a square sum of differences of pixel values, for example. Definition of the quantity of distortion S(i,j) itself is conventionally known, and the motion compensation portion 18 (in FIG. 46, FIG. 1, and so on) defines the motion vector V with such (i,j) that the quantity of distortion S(i,j) becomes the smallest in (i,j) in a certain range (e.g., i,j=-N to +N) and defines the predictive picture 30 with the corresponding picture part. The quantities of distortion S(i,j) are calculated for (i,j) in a certain range (e.g., i,j=-N to +N) also in Step S72.

Next, in Step S73, quantization steps $Q_r(i,j)$ are calculated. This processing is carried out by the $Q_r(i,j)$ calculating portion 73. The quantization steps $Q_r(i,j)$ are the quantization steps in the parts of the reference picture 70 for which the quantities of distortion S(i,j) have been calculated in Step S72.

Quantization step direction signals 33 corresponding to quantization steps for individual macro blocks, which have been calculated for the picture signal PS one frame before the current processed object (i.e., the current reference picture) by the quantization step control portion 41, are stored in the storage portion 57 (FIG. 42.) The $Q_r(i,j)$ calculating portion 73 refers to the quantization step direction signals 33 stored in the storage portion 57 to calculate the quantization steps $Q_r(i,j)$. The quantization steps $Q_r(i,j)$ are calculated for (i,j) in the same range as that in Step S72.

The parts of the reference picture 70 subjected to the calculation of the quantization steps $Q_r(i,j)$ usually lie over a plurality of macro blocks, like the predictive pictures $MB_r1$ and $MB_r2$ illustrated in FIG. 32 and FIG. 33. Similarly to the $Q_r$ calculating portion 58, the $Q_r(i,j)$ calculating portion 73 calculates the value of a quantization step $Q_r(i,j)$ as an average value in accordance with areas of individual macro blocks appearing in the picture part.

Next, in Step S74, the value of the reference value $R_{re}$ referred to in the following Step S75 is calculated. The processing is carried out by the $R_{re}$ calculating portion 74. The reference value $R_{re}$ can be calculated by the algorithm corresponding to operation by the $R_{re}$ calculating portion 59 (FIG. 29.)

For example, the reference value $R_{re}$ is calculated by referring to the quantization step direction signals 33 stored in the storage portion 57 as an average value of the quantization steps over the entire reference picture 70 or as a value relative to this average value (e.g., the sum or the product of the average value and a constant). When a common value is used for all macro blocks in one picture signal PS as a reference value $R_{re}$ like these examples, it is sufficient to perform Step S74 only when the first macro block is processed in the processing of one picture signal PS.

Or, the reference value $R_{re}$ may be calculated as an average value of quantization steps in the part of the reference picture 70 for which the quantization step $Q_r(i,j)$ was calculated and its vicinity, or as a value relative to this average value. Then the reference value $R_{re}$ depends on $(i,j)$ like the quantization step $Q_r(i,j)$.

Next, the processing moves to Step S75. This processing searches for $(i,j)$ with which the quantity of distortion $S(i,j)$ becomes the smallest in the range calculated in Step S72. That is to say, the same processing as the search of the motion vector V in the motion compensation portion 18 (FIG. 1, etc.) is performed. Subsequently, for that $(i,j)$, the quantization step $Q_r(i,j)$ and the reference value $R_{re}$ are compared. If the comparison shows that the quantization step $Q_r(i,j)$ is equal to or smaller than the reference value $R_{re}$, the processing moves to Step S76 and if it is determined that it is larger than the reference value $R_{re}$, it moves to step S77.

In Step S76, the $(i,j)$ with which the quantity of distortion $S(1i,j)$ becomes the smallest, i.e., the $(i,j)$ obtained in Step S75 is determined as the motion vector V. On the other hand, in Step S77, such $(i,j)$ that the quantization step $Q_r(i,j)$ becomes the smallest in the range calculated in Step S73 is searched for. Then the found $(i,j)$ is determined as the motion vector V. That is to say, if the quantization step in part of the reference picture 70 corresponding to the motion vector V in the usual sense is small enough, the motion vector V is not changed, and if it is large over a certain limit, the motion vector V is changed to the $(i,j)$ which minimizes the quantization step $Q_r(i,j)$.

When the processing in Step S76 or Step S77 is finished, the processing moves to Step S78, where the determined motion vector V is outputted and the picture portion in the reference picture 70 corresponding to this motion vector V is outputted as the predictive picture 30. When the processing in Step S78 is finished, the processing in Step S71 also finishes and the processing moves to Step S6 (FIG. 41.) The processings in Step S75 to S78 are carried out by the determination portion 76.

This way, in the device 106, when the quantization step of a predictive picture 30 is not small enough, the predictive picture 30 and the motion vector V are modified so that the quantization step becomes smaller. Accordingly, even if the quantization step of the predictive picture is large and the quantization error is large, it is possible to prevent the large quantization error from being transmitted to the coded signal CS. That is to say, it is possible to prevent deterioration of picture quality in coding from being unnecessarily transmitted to the following pictures, resulting in improvement of picture quality.

The characteristics of the sixth to eighth preferred embodiments can be realized in arbitrary combinations to further enhance the effects.

<9. Modifications>

Figure 44:
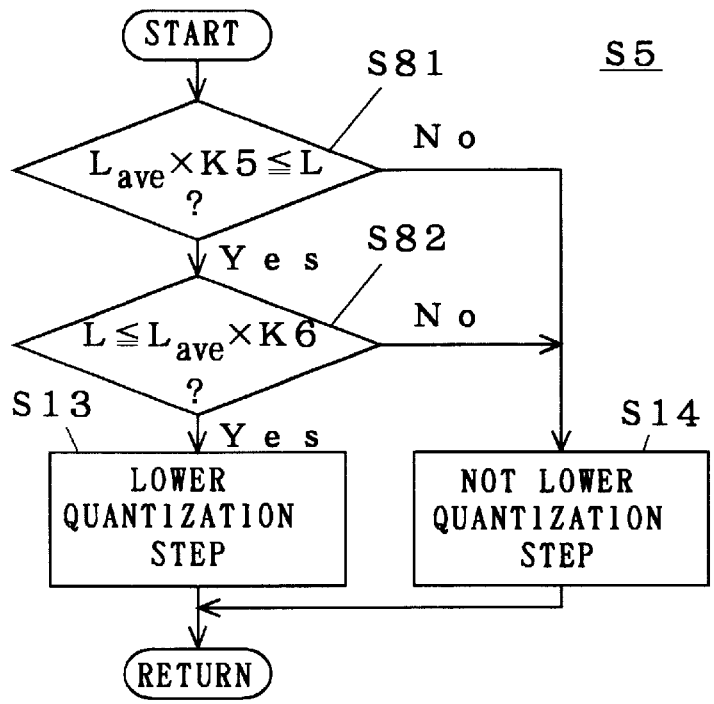
FIG. 44 is a flow chart showing a modification of Step S5 of FIG. 3.

(1) Although Steps S11 and S12 of FIG. 5 have shown an example in which a reference value relative to the average quantity of motion $L_{ave}$ is provided as a sum of the average quantity of motion $L_{ave}$ and a constant, the reference value can generally be provided as a function which increases (decreases) as the average quantity of motion $L_{ave}$ increases (decreases.) For example, the processing in Step S5 in FIG. 3 may be performed according to the flow chart of FIG. 44 replacing that of FIG. 5. In FIG. 44, the reference values are defined as products of the average quantity of motion $L_{ave}$ and non-negative constants K5 and K6 (where K6<K5) in Steps S81 and S82.

Figure 45:
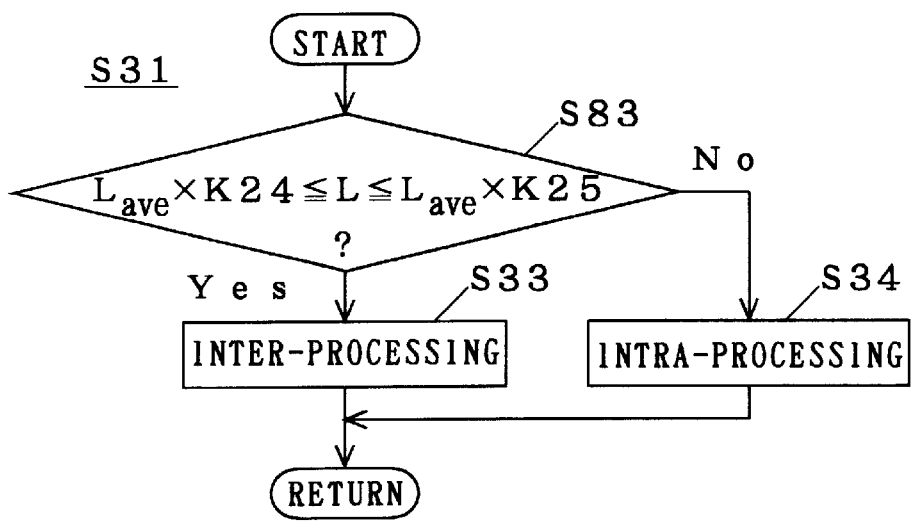
FIG. 45 is a flow chart showing a modification of Step S31 of FIG. 14.

Similarly, the processing in Step S31 in FIG. 14 may be performed with the flow chart of FIG. 45, replacing that of FIG. 16, for example. In FIG. 45, the two reference values are defined as products of the average quantity of motion $L_{ave}$ and non-negative constants K24 and K25 (where K24<K25) in Step S83.

(2) The first to eighth preferred embodiments have shown the examples in which a control portion includes the target bit allocate portion 43, the rate control portion 44 and the adaptive quantization portion 45 and these components carry out the processing in Steps S1 to S3. This processing is adapted to coding at a fixed rate. The present invention, however, is applicable not only to coding at a fixed rate but also to coding at a variable bit rate.

While the invention has been described in detail, the foregoing description is in all aspects illustrative and not restrictive. It is understood that numerous other modifications and variations can be devised without departing from the scope of the invention.

We claim:

1. A picture coding device wherein an input picture is divided into a plurality of blocks, and one of inter-picture coding using a predictive picture and motion vector and intra-picture coding can be selectively performed for each of said plurality of blocks, each coding including quantization processing, said picture coding device comprising:

motion compensation means for comparing a reference picture obtained by decoding a coded picture and said input picture to determine said predictive picture in said reference picture for each of said plurality of blocks, determining said motion vector as motion relative to said predictive picture for each of said plurality of blocks, and calculating a magnitude of said motion vector representing a quantity of motion;

average value calculating means for calculating an average value of said quantity of motion over a certain range of said plurality of blocks;

reference value group calculating means for calculating a reference value group, including at least one reference value; and quantization step correcting means for comparing said quantity of motion with said reference value group including at least one reference value and correcting quantization step in said quantization processing according to a result of the comparison for each of said plurality of blocks;

wherein each of said at least one reference value is provided as a value relative to said average value.

2. The picture coding device according to claim 1, wherein said value relative to said average value is provided as a sum or a product of said average value and a constant.

3. The picture coding device according to claim 1, wherein said average value calculating means uses the entirety of said reference picture as said certain range.

4. The picture coding device according to claim 1, wherein said average value calculating means uses already-coded part in said input picture as said certain range.

5. The picture coding device according to claim 1, wherein said average value calculating means uses said reference picture plus already-coded part in said input picture as said certain range.

6. The picture coding device according to claim 1, wherein said average value calculating means comprises: a selecting means for selecting said reference picture as said certain range if an area of already-coded part in said input picture is equal to or smaller than a predetermined range and selecting the already-coded part in said input picture if it exceeds the predetermined range.

7. The picture coding device according to claim 1, wherein each said input picture is inputted twice, and said average value calculating means calculates said average value using the entirety of said input picture as said certain range on the basis of said input picture inputted at the first time.

8. The picture coding device according to claim 1, wherein said at least one reference value which belongs to said reference value group which said quantization step correcting means refers to includes two reference values, and said quantization step correcting means makes a correction to lower said quantization step when said quantity of motion is between said two reference values.

9. A picture coding device wherein an input picture is divided into a plurality of blocks, and one of inter-picture coding using a predictive picture and motion vector and intra-picture coding can be selectively performed for each of said plurality of blocks, each coding including quantization processing, said picture coding device comprising:

motion compensation means for comparing a reference picture obtained by decoding a coded picture and said input picture to determine said predictive picture in said reference picture for each of said plurality of blocks, determining said motion vector as motion relative to said predictive picture for each of said plurality of blocks, and calculating a magnitude of said motion vector representing a quantity of motion;

reference value group calculating means for calculating a reference value group, including at least one reference value; and inter/intra directing means for comparing said quantity of motion with the reference value group including at least one reference value and directing whether to conduct said inter-picture coding or said intra-picture coding according to a result of the comparison for each of said plurality of blocks.

10. The picture coding device according to claim 9, further comprising quantization step correcting means for comparing said quantity of motion with another reference value group including at least one reference value and correcting quantization step in said quantization processing according to the result for each of said plurality of blocks.

11. The picture coding device according to claim 10, further comprising average value calculating means for calculating an average value of said quantity of motion over a certain range of said plurality of blocks, wherein said quantization step correcting means uses a value relative to said average value as each said at least one reference value belonging to said reference value group to which said quantization step correcting means refers.

12. The picture coding device according to claim 9, further comprising average value calculating means for calculating an average value of said quantity of motion over a certain range of said plurality of blocks, wherein said inter/intra directing means uses a value relative to said average value as each said at least one reference value which belongs to said reference value group.

13. The picture coding device according to claim 9, wherein said at least one reference value which belongs to said reference value group which said inter/intra indicating means refers to includes two reference values, and said inter/intra directing means provides a direction so that said inter-picture coding is conducted when said quantity of motion takes a value between said two reference values and provides a direction so that said intra-picture coding is conducted when said quantity of motion takes other values.

14. A picture coding device wherein an input picture is divided into a plurality of blocks, and one of inter-picture coding using a predictive picture and motion vector and intra-picture coding can be selectively performed for each of said plurality of blocks, each coding including quantization processing, said picture coding device comprising:

motion compensation means for comparing a reference picture obtained by decoding a coded picture and said input picture to determine said predictive picture in said reference picture for each of said plurality of blocks and determining said motion vector as motion relative to said predictive picture for each of said plurality of blocks;

quantization step calculation means for calculating quantization step for said predictive picture;

reference value calculating means for calculating a reference value;

comparing means for comparing said quantization step with the reference value; and operation means for making a correction to lower a quantization step of a macro block in said input picture corresponding to said predictive picture when said quantization step is larger than said reference value.

15. The picture coding device according to claim 14, wherein said quantization step calculating means obtains a weighted average of values of quantization steps of macro blocks which overlap with the picture region for which said quantization step is calculated, by weighting with areas of the overlapping parts to thereby calculate the quantization step of said picture region.

16. The picture coding device according to claim 14, wherein said reference value calculating means calculates a value relative to an average value of quantization step over a certain range of said reference picture and provides the value to said reference value.

17. A picture coding device wherein an input picture is divided into a plurality of blocks, and one of inter-picture coding using a predictive picture and motion vector and intra-picture coding can be selectively performed for each of said plurality of blocks, each coding including quantization processing, said picture coding device comprising:

motion compensation means for comparing a reference picture obtained by decoding a coded picture and said input picture to determine said predictive picture in said reference picture for each of said plurality of blocks and determining said motion vector as motion relative to said predictive picture for each of said plurality of blocks;

quantization step calculating means for calculating quantization step for said predictive picture;

reference value calculating means for calculating a reference value using an average value of said quantization step over a certain range of said plurality of blocks;

comparing means for comparing said quantization step with the reference value; and means for providing a direction so that said intra-picture coding is applied to a macro block in said input picture corresponding to said predictive picture when said quantization step is larger than said reference value and said inter-picture coding is applied when it is not so.

18. A picture coding device wherein an input picture is divided into a plurality of blocks, and one of inter-picture coding using a predictive picture and motion vector and intra-picture coding can be selectively performed for each of said plurality of blocks, each coding including quantization processing, said picture coding device comprising:

motion compensation means for, on the basis of a reference picture obtained by decoding a coded picture and said input picture, determining said predictive picture in said reference picture for each of said plurality of blocks and determining said motion vector as motion relative to said predictive picture for each of said plurality of blocks;

said motion compensation means including, quantity-of-distortion calculating means for calculating a quantity of distortion for each of said plurality of blocks, said quantity of distortion corresponding to magnitude of a gap of pixel values between each of a group of picture parts in said reference picture obtained by shifting said each of said plurality of blocks in pixel units in a predetermined range and said each block, quantization step calculating means for calculating quantization step of each of said group of picture parts, and determining means for comparing said quantization step of a picture part which minimizes said quantity of distortion in said group of picture parts with a reference value to select a picture part which minimizes said quantization step as said predictive picture from among said group of picture parts when the former is larger than the latter and select said picture part which minimizes said quantity of distortion when the former is equal to or smaller than the latter.

* * * * *